(12) United States Patent
Te et al.

(10) Patent No.: US 9,895,847 B2
(45) Date of Patent: Feb. 20, 2018

(54) METHOD AND APPARATUS FOR FABRICATING THREE DIMENSIONAL MODELS

(71) Applicant: SOLIDSCAPE, INC, Merrimack, NH (US)

(72) Inventors: Bun Chay Te, Nashua, NH (US); John Theodore Wigand, Nashua, NH (US)

(73) Assignee: Solidscape, Inc., Merrimack, NH (US)

( * ) Notice: Subject to any disclaimer, the term of this patent is extended or adjusted under 35 U.S.C. 154(b) by 477 days.

(21) Appl. No.: 14/554,393

(22) Filed: Nov. 26, 2014

(65) Prior Publication Data

US 2015/0147421 A1    May 28, 2015

Related U.S. Application Data

(60) Provisional application No. 61/909,623, filed on Nov. 27, 2013.

(51) Int. Cl.
| | |
|---|---|
| *B29C 64/20* | (2017.01) |
| *B29C 67/00* | (2017.01) |
| *B28B 1/00* | (2006.01) |
| *B33Y 30/00* | (2015.01) |
| B22F 3/00 | (2006.01) |
| B29K 101/12 | (2006.01) |

(52) U.S. Cl.
CPC .......... *B29C 67/0092* (2013.01); *B28B 1/001* (2013.01); *B29C 67/0055* (2013.01); *B29C 67/0059* (2013.01); *B29C 67/0085* (2013.01); *B33Y 30/00* (2014.12); *B22F 3/008* (2013.01); *B29K 2101/12* (2013.01)

(58) Field of Classification Search
CPC ......................... B29C 64/205; B29C 64/209
See application file for complete search history.

(56) References Cited

U.S. PATENT DOCUMENTS

| | | | |
|---|---|---|---|
| 4,247,508 | A | 1/1981 | Housholder |
| 5,121,329 | A | 6/1992 | Crump |
| 5,136,515 | A | 8/1992 | Helinski |
| 5,209,878 | A | 5/1993 | Smalley et al. |
| 5,260,009 | A | 11/1993 | Penn |
| 5,340,433 | A | 8/1994 | Crump |

(Continued)

*Primary Examiner* — Alison L Hindenlang
(74) *Attorney, Agent, or Firm* — Davis & Bujold PLLC; Michael J. Bujold

(57) ABSTRACT

A contact coating device comprising a high viscosity rapid deposition head comprising a deposition body defining a material supply passage; a dispensing/shaping nozzle being formed adjacent in a leading end surface of the high viscosity rapid deposition head for dispensing of the high viscosity material from the high viscosity rapid deposition head, and the dispensing/shaping nozzle comprising a dispensing cavity; at least one dispensing passage providing communication between the material supply passage and the dispensing/shaping nozzle for suppling the high viscosity material to the dispensing cavity; and a heating element for heating a portion of the high viscosity rapid deposition and facilitating flow of the high viscosity material through the high viscosity rapid deposition head. A multi-head material deposition system which comprises a first drop-on-demand device, a second drop-on-demand device and at least one contact coating rapid deposition head is also disclosed.

21 Claims, 20 Drawing Sheets

(56) References Cited

U.S. PATENT DOCUMENTS

| | | | |
|---|---|---|---|
| 5,506,607 | A | 4/1996 | Sanders, Jr. et al. |
| 5,740,051 | A | 4/1998 | Sanders, Jr. et al. |
| 6,175,422 | B1 | 1/2001 | Penn et al. |
| 7,003,864 | B2 | 2/2006 | Dirscherl |
| 7,700,016 | B2 | 4/2010 | Wigand et al. |
| 7,993,123 | B2 | 8/2011 | Wigand et al. |
| 2002/0129485 | A1 | 9/2002 | Mok et al. |
| 2004/0089980 | A1 | 5/2004 | Owada |
| 2005/0087897 | A1 | 4/2005 | Nielsen et al. |
| 2009/0025282 | A1 | 1/2009 | Adelman |
| 2011/0064784 | A1* | 3/2011 | Mullens ............... B22F 3/1121 424/443 |
| 2014/0291886 | A1* | 10/2014 | Mark ................... B29C 47/004 264/163 |
| 2015/0037445 | A1* | 2/2015 | Murphy ............. B29C 67/0088 425/131.1 |

* cited by examiner

METHOD AND APPARATUS FOR FABRICATING THREE DIMENSIONAL MODELS

This application claims priority from U.S. provisional application No. 61/909,623 filed Nov. 27, 2013.

FIELD OF THE INVENTION

The present invention relates to a method and apparatus for fabricating three dimensional models by deposition of successive layers comprising a model material and a sacrificial material where, for each layer, the sacrificial material is first deposited by a drop-on-demand dispensing head and the model material is then deposited by an improved high deposition rate device.

BACKGROUND OF THE INVENTION

Contemporary design processes often require the rapid fabrication of prototypes and models of complex mechanical parts in low volumes and with minimum setup and fabrication times to allow the evaluation and testing of the design of such parts within very short design and development periods. Most conventional fabrication methods, however, are unsuitable for such purposes. Manual machining, for example, is sometimes suitable for relatively simple designs but is too slow and expensive for complex designs and Computer Numerically Controlled (CNC) machine processes, while suitable for complex designs, have significant limitations as regards the types or configurations of parts that can be fabricated.

The need for rapid, low cost, low volume fabrication of complex parts has generally been met by the development of various three dimensional (3D) modeling processes that employ layer by layer "printing" processes. In typical 3D modeling processes of the prior art, a part is built up by the successive deposition of layers comprising a "model" material forming the actual part and a sacrificial material that provides support for the model material during the fabrication process, with the sacrificial material being subsequently removed, during a removal process, thereby leaving the model material forming the actual part.

Examples of 3D modeling processes of the prior art are described for example, in U.S. Pat. Nos. 4,247,508, 5,136,515, 5,260,009, 5,506,607, 5,740,051, and 6,175,422. Yet other systems and methods of the prior are described, for example, in U.S. Patent Publication Nos. 2009/025282 and 2005/087897, which relate to variations of the basic method for constructing a model by deposition of successive layers of a model material. U.S. Pat. No. 5,209,878 relates to the use of either thin partial layers of material or a material capable forming a meniscus in the edge regions between successive layers of different dimensions. U.S. Patent Publication No. 2002/0129485 describes a system which is an agglomeration of previously known systems for fabricating three dimensional objects which thereby provides a very flexible, but complex system capable of achieving features of a wide variety of methods.

U.S. Pat. No. 5,121,329 relates to an apparatus incorporating a movable dispensing head driven by a computer utilizing computer aided design (CAD). The apparatus includes a protruding discharge nozzle, having a bottom surface with a flat face, for sequentially forming layers of a desired material. A supply material control is provided via constant fluid pressure of the supply material and proportionally regulating the linear speed of the drive motor in relation to the speed of the dispensing head. U.S. Pat. No. 5,340,433 is a related continuation-in-part in which the material is supplied in the form of a continuous, flexible strand or filament.

Other prior art systems employ methods somewhat analogous to those used to construct three dimensional objects as successive layers of different materials, but as adapted specifically and essentially to object molding processes. For example, U.S. Patent Publication No. 2004/0089980 describes a method for fabricating three dimensional models by deposition and machining three or four successive thick layers, thereby concurrently forming a mold for the object and the object itself.

U.S. Pat. No. 7,003,864 describes a method, that is generally similar to U.S. Patent Publication No. 2004/0089980, of depositing and machining three layers which concurrently form a mold for an object and the object itself, including depositing and planing a base layer of support material, depositing and removing regions of a second layer to form a mold of the part, adding a construction material to the removed regions of the second layer, and planing or machining the support and construction materials of the second layer.

SUMMARY OF THE INVENTION

The present invention is directed to a method and apparatus for fabricating three dimensional models and, more specifically, by fabrication of three dimensional models by deposition of successive layers comprising a build or model material and a support or sacrificial material where, for each layer, the support or sacrificial material is generally first deposited by a drop-on-demand dispensing head and the build or model material is then generally deposited, by a high deposition rate device, thereby forming a composite model formed of the sacrificial material and the model material. The present invention also permits changing the dispensing order of the dispensed materials so that the build or model material may be deposited first, by a drop-on-demand dispensing head, and the support or sacrificial material may then be deposited second, by a high deposition rate device. Upon completion of the model, the sacrificial material is then removed from the composite model, by a process effecting only the sacrificial material, thereby leaving the final model formed from the model material.

More specifically, the present invention is directed to a high viscosity material deposition rapid deposition head for depositing a layer of a high viscosity material on a layer of model material and/or mold/support material. The high viscosity device contains a dispensing and shaping nozzle formed in the dispensing end of the high viscosity device body. The high viscosity material is designed to deposit material from the dispensing nozzle onto a preceding layer and is shaped by a shaping and dispensing surface. Preferably the dispensing nozzle is recessed into the shaping and dispensing end of the nozzle so as to form a material reservoir for storing a reserve quantity of the high viscosity material to be deposited onto the preceding layer.

According to various embodiments, the dispensing passage or passages may comprise at least one of: (1) a single slot having a width corresponding with a width of a path of the high viscosity material to be deposited on the preceding layer, and (2) a plurality of dispensing holes arranged to deposit the high viscosity material along the path of the high viscosity material to be deposited on the preceding layer.

An object of the present invention is to control the spacing between the rapid deposition head and the preceding layer as well as the flow rate of the model or the sacrificial material flowing through the rapid deposition head so as to deposit a substantially uniform wide layer of the model or the sacrificial material on the layer being deposited and thereby increase the deposition speed of the model or the sacrificial material, particularly with respect to highly viscous model or sacrificial material with minimal passes or movement of the rapid deposition head during dispensing of the current layer being deposited.

Yet another object of the present invention is to provide a rapid deposition head which is able to deposit a viscous material, e.g., deposit a viscous material having a viscosity of at least 6,000 centipoise, more preferably having a viscosity of greater than 8,000 centipoise, most preferably having a viscosity of at least 10,000 centipoise.

A still further object of the present invention is to control: (1) the flow rate of the material being supplied to and dispensed via the rapid deposition head, (2) the rate at which the rapid deposition head and associated support table are moved relative to one another, and (3) the spacing distance between the shaping and dispensing surface, supporting the dispensing outlet of the rapid deposition head, and the previously layer so as to facilitate deposition of a substantially uniform layer of the high deposition material as part of the layer being fabricated.

Another object of the invention is to increase the width/diameter/dimensions of the deposition from the rapid deposition head, which dispenses the high viscosity material, so that a much wider deposition of the high viscosity material is deposited during a single pass of the rapid deposition head, than a width of the material being deposited by the drop-on-demand head, so as to facilitate an increased deposition rate of the high viscosity material by the rapid deposition head for the layer currently being fabricated.

Yet another object of the present invention is to facilitate dispensing of high viscosity blended materials, e.g., a particulate ceramic powder mixed with a binder to form a high viscosity composite material, which is suitable for dispensing by the rapid deposition head according to the present invention.

A still further object of the present invention is to closely position the rapid deposition head, adjacent the previously deposited layer, so that the spacing or separation between those two components, from one another, is preferably less than six thousands of an inch (0.006), and more preferably such spacing is about three to four thousands of an inch (0.003-0.004) or so such that such the high viscosity material is essentially dispensed continuously from the rapid deposition head onto the current layer being deposited as a continuous uninterrupted uniformly thick stream of the high viscosity material as the rapid deposition head translates across the associated support table in a desired dispensing pattern.

Still another object of the present invention is to control the flow rate of the viscous material, supplied to the rapid deposition head, by using, for example, a positive displacement pump, a resonant frequency pump, a piezoelectric actuator, etc. Such control of the flow rate facilitates precise and accurate dispensing of the high viscosity material to the rapid deposition so as to precisely control the flow rate of the high viscosity material being deposited by the rapid deposition head on the previous layer and thereby precisely match the translation speed/movement of the rapid deposition head relative to the support table. Precise control of the flow rate of the viscous material is particularly important when dispensing a precious metal(s), such as gold, silver, platinum, etc., where dispensing precision of utmost importance.

Another object of the present invention is to control the supply temperature of the high viscosity material, as the high viscosity material is dispensed from the rapid deposition head. This will minimize the "wait (solidification or cure) time" required before the most recently deposited layer can be cut off, shaved or planed to complete formation of the currently layer being fabricated.

A still further object of the present invention is to dispense the high viscosity material from the rapid deposition head so that the rapid deposition head moves at a substantially constant velocity. This, in turn, increases the deposition speed of the high viscosity material on the layer currently being fabricated and thereby further improves the manufacturing speed and efficiency according to the present invention. In particular, the rapid deposition head may follow a spiral or some other type of curve dispensing pattern which assists with maintaining a substantially constant velocity of the rapid deposition head, during deposition of the high viscosity material. Therefore, the rapid deposition head minimizes the amount of time required to complete deposition of the high viscosity material on the layer currently being fabricated.

Yet another object of the present invention is to control the flow rate of the high viscosity material, to the rapid deposition head, so as to avoid any excess puddling or pooling of any of the high viscosity material (e.g., supplying excess high viscosity material to the dispensing head and on to the layer being fabricated) when the rapid deposition head is either slowing down or changing its direction of movement while still dispensing the high viscosity material.

A still further object of the present invention is to provide a fan, a vacuum, a blower, etc., to assists with cooling/curing/solidification of the high viscosity material, immediately after deposition of the high viscosity material is completed, so that layer currently being fabricated can be promptly cut off, shaved or planed and fabrication of the next subsequent layer can commence as rapidly as possible.

Another object of the present invention is to position the rapid deposition head much closer to the layer being deposited, then a conventional drop-on-demand head, and also dispense, via the rapid deposition head, a wider layer of the high viscosity material, than the width of the material deposited by the drop-on-demand head or a conventional spray head, for example. More preferably, the rapid deposition head will be located twice as close to the previously deposited layer, then the drop-on-demand head. Likewise, the width of the deposited high viscosity material will have a width that is at least five (5) time, and more preferably have a width that is at least ten (10) times and most preferably have a width that is at least fifteen (15) times the width of the material deposited by the drop-on-demand head.

Yet another object of the present invention is to provide a system and a method, for both the drop-on-demand and the rapid deposition of materials, which are both readily scalable up or down so as to facilitate manufacture of very small intricate parts as well as very large items and components.

A still further object of the present invention is to deposit a high viscosity material that rapidly hardens, solidifies, cures, etc., substantially instantaneously or immediately after deposition (e.g., within 40 seconds or less, for example) so as to facilitate cutting off, shaving or planing a small top portion of the deposited current layer as well as deposition of a next subsequent layer. In particular, the high viscosity material may contain one or more component(s) which rapidly evaporates immediately after deposition, is cured via a light source immediately after deposition, undergoes a phase change immediately after deposition, etc., so that the deposit high viscosity material readily hardens, solidifies, cures, etc., and can be rapidly cut off, shaved or planed.

BRIEF DESCRIPTION OF THE DRAWINGS

The invention will now be described, by way of example, with reference to the accompanying drawings in which:

FIG. 8 illustrates the high viscosity rapid deposition head in a retracted position, space from a preceding layer, while

DETAILED DESCRIPTION OF THE PREFERRED EMBODIMENTS

A. Introduction

Figure 1:
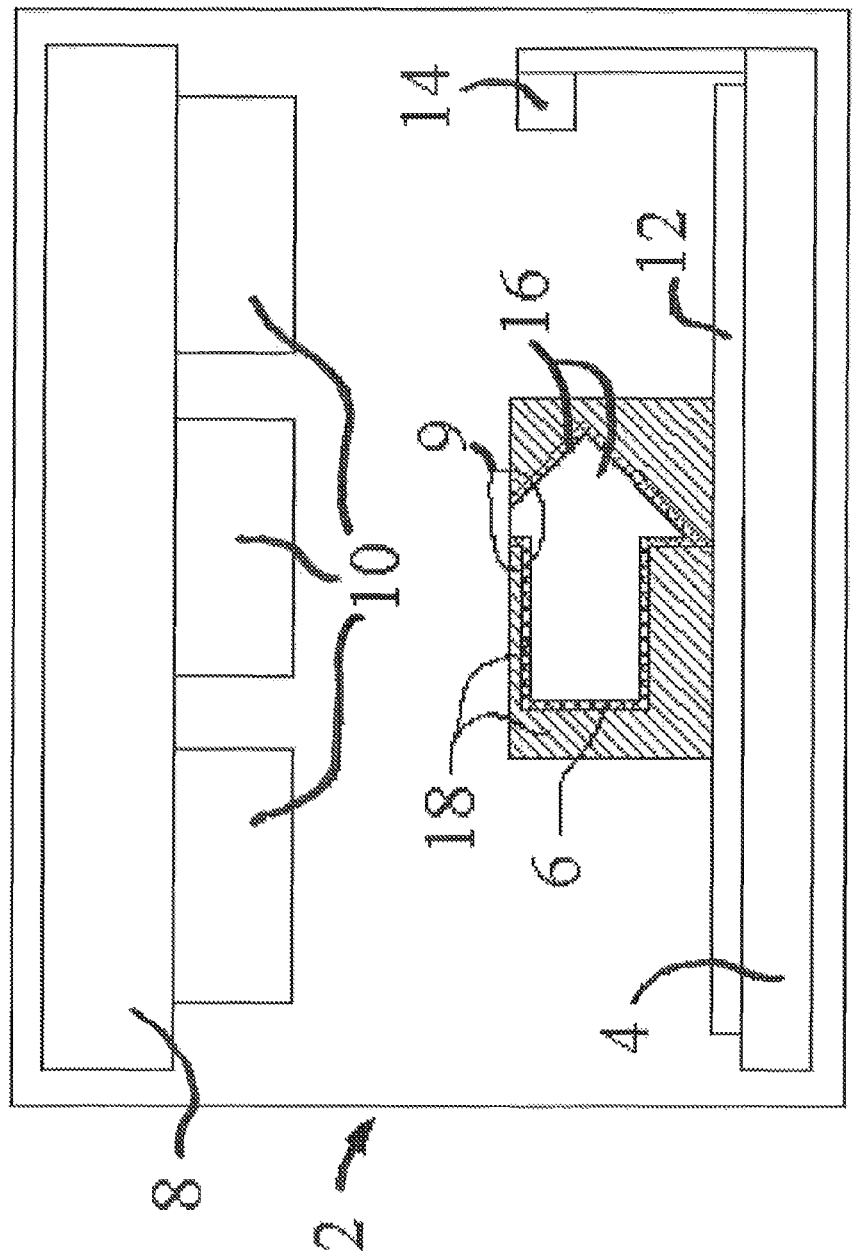
FIG. 1 is a diagrammatic drawing of a basis system for fabrication of a three dimensional model according to the present invention.

The present invention is directed to a method and a system for fabricating three dimensional models by the fabrication of a composite model formed of successive layers of materials, with each successive layer of material typically comprising either, or both, a build material, generally comprising the model material, and a support material, generally comprising a sacrificial material. The build or model material, typically forming the part or the model to be fabricated, is generally deposited, in each required layer, via a drop-by-drop basis to allow the precision delineation of the surfaces of the part or the model. The support material is typically deposited at a significantly higher deposition rate, with a top portion of each fabricated layer subsequently being cut, shaved or planed to form a completed deposition surface for the next subsequent layer. The support material thereby forms a shell which completely surrounds and encases the build material and, following at least one removal process, either the exterior outwardly facing surface of the shell or the exterior outwardly facing surface of the build material, if the shell is also removed during a second removal step, forms the exterior outwardly facing surface of the final 3-D model.

The following disclosure will first describe the method and the system of the present invention which is generally utilized for the fabrication of three dimensional models, including a method for formation of layers and volumes of a model which provides significant advantages with respect to the precision and surface finish of the surfaces of the model. This description with then be followed by a detail disclosure which includes the devices for the drop-by-drop and the rapid deposition of the model and the sacrificial materials, an improved apparatus for the rapid deposition of the model and the sacrificial materials, and, in particular, a method and apparatus for allowing a model to be fabricated from a larger range of materials, including high viscosity materials that, heretofore, were not deliverable via conventional drop-on-demand deposition devices and that may not be suitable for delivery by currently known rapid deposition devices.

Apparatuses for performing certain of the basic processes for fabricating composite three dimensional models are illustrated, for example, in U.S. Pat. No. 7,700,016 issued to Wigand et al. on Apr. 20, 2010 for a Method And Apparatus For Fabricating Three Dimensional Models and U.S. Pat. No. 7,993,123 issued to Wigand et al, on Aug. 9, 2011, also titled Method And Apparatus For Fabricating Three Dimensional Models, and the disclosures of both of those patents are hereby incorporated by reference in their entirety.

The following describes an improved version of the apparatuses described in U.S. Pat. Nos. 7,700,016 and 7,993,123, wherein the improved apparatus includes the capability of performing, in particular, the processes described herein. The improved apparatus described herein below will also include methods and mechanisms of the present invention for the establishment, monitoring and control of the positions, orientations and tolerances between the elements of an apparatus for fabricating three dimensional models from preceding layers of the model and the sacrificial materials, including establishing, monitoring and controlling the thicknesses, rates of deposition and edge orientations and tolerances of the deposited materials.

Referring now to FIG. 1 which is a diagrammatic view of a three dimensional model fabrication system 2 incorporating the present invention. As shown therein, the fabrication system 2 includes a vertically movable workpiece support table 4 for supporting a composite model 6 being fabricated and a tool platform 8, spaced from and supported vertically above the workpiece support table 4. The tool platform 8 supports a plurality of fabrication tools 10 (only diagrammatically shown), such as at least two material deposition devices and possibly one or more milling tools, and the plurality of fabrication tools 10 are movable, by the tool platform 8, with respect to the workpiece support table 4. It must be recognized and understood with regard to the following description of the present invention that the number and location of the fabrication tools 10, e.g., the material deposition devices and/or milling tools carried by or formed as part of the tool platform 8 may vary significantly from that diagrammatically shown in drawings while still remaining within the spirit and scope of the present invention.

The workpiece support table 4 is vertically movable along a vertical Z axis with respect to a tool plane while tool platform 8 is supported vertically above the workpiece support table 4 and is movable, in a conventional manner, along a horizontal X-Y axis. The tool platform 8 is generally supported on and is movable along a Y-axis rail that extends along a horizontal Y-axis of the tool plane. The opposed ends of Y-axis rails are, in turn, supported upon and are movable along a pair of corresponding generally horizontal X-axis rails that are located on opposite sides of the workpiece support table 4 and extend parallel to a horizontal X-axis of the tool plane that is orthogonal to Y-axis in the tool plane. As such movement of the tool platform 8, relative to the workpiece support table 4, is conventional and well known in the art, a further detailed discussion concerning the same is not provided.

The tool platform 8, with the fabrication tools 10, is thereby generally positional anywhere within the tool plane, which is typically parallel to the composite model 6 and, in particular, the top most layer of the composite model 6 being fabricated. The composite model 6 is vertically movable, via the workpiece support table 4, along the Z-axis with respect to the tool plane so as to alter the relative position between the workpiece support table 4 and the fabrication tools 10. It should be noted, however, that while the layers of the composite model 6 being fabricated are parallel to the X-Y tool plane, as a consequence of each successive layer being deposited and shaped by the associated tools 10 mounted on the tool platform 8, the plane of the workpiece support table 4 may not necessarily be parallel to the tool plane in all times. While the orientation of the plane of workpiece support table 4 is controllable with respect to the tool plane, there may be certain circumstances or instances in which it is advantageous or desirable to angularly offset the orientation of the plane of the workpiece support table 4 with respect to the tool platform 8.

It is to be appreciated that the workpiece support table 4 may be designed and adapted to receive and temporarily secure a removable/replaceable workpiece platform 12. The replaceable workpiece platform 12 may comprise, for example, a relatively dense and typically non-porous or closed cell foam or plastic material which has a relative smooth, typically non-absorbent, upper surface. The workpiece platform 12 is removably mounted, in a conventional manner by one or more fasteners (not shown), to the top surface of the workpiece support plate 4, with the composite model 6 being fabricated on the upper surface of the workpiece platform 12.

It will be seen, therefore, that the workpiece platform 12 and the workpiece support plate 4 perform a number of functions, such as providing a mechanism for handling a finished composite model without damage to the composite model 6, such as when removing the composite model from the fabrication system 2 for subsequent processing, e.g., when removing the extraneous model material and/or the shell material. In addition, the workpiece platform/workpiece support plate 4, 12 provides an offset between the tool platform 8, the fabrication tools 10 and a conventional planing device 14, which is movable relative to the workpiece platform/workpiece support plate 4, 12 in order to shave off a small portion of the deposited layer to complete fabrication of that layer. The workpiece platform 12 also provides a readily and inexpensively disposable mechanism for protecting the workpiece support table 4 from normal wear and contamination and from undesired accumulation of, for example, sacrificial and/or model material during the fabrication process.

As generally illustrated in FIGS. 13-19, the material deposition devices will comprise at least one drop-by-drop material deposition device and typically at least one high deposition rate device, and more preferably will comprise at least two drop-by-drop material deposition devices and at least one high deposition rate device.

As also shown, and as described herein above and in U.S. Pat. Nos. 7,700,016 and 7,993,123, the fabrication system 2 will include the planing device 14 for removing a portion of a deposited layer of a support or sacrificial material 18 and a build or model material 16 to reduce the layer to a selected deposited thickness and thereby establish a perfectly flat and planed upper surface of the build layer in preparation for the next succeeding build layer or termination layer.

Figure 2:
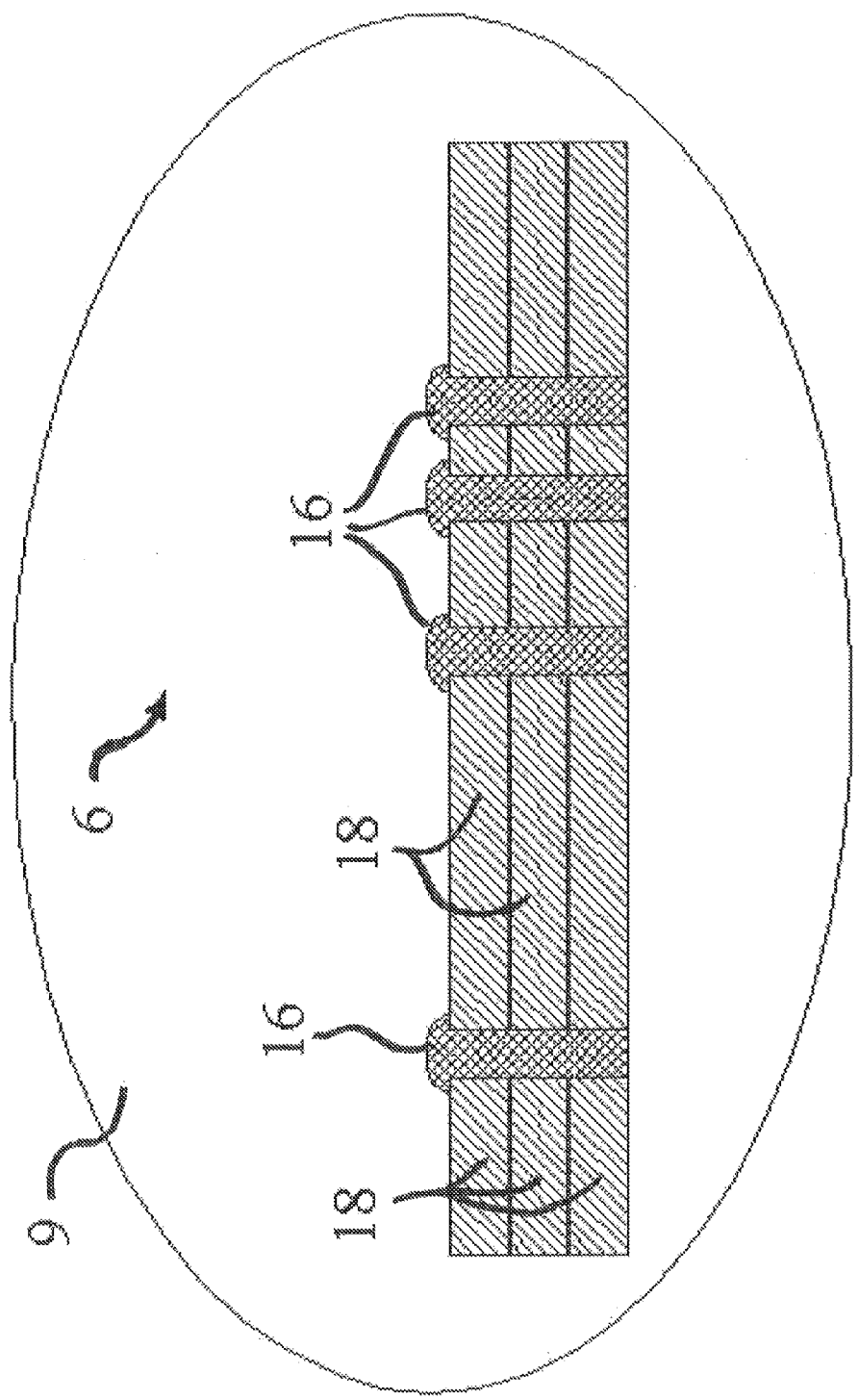
FIG. 2 is a diagrammatic view showing a current layer being fabricated on the preceding layer.

As is conventional in the art, each 3-D model is fabricated from a plurality of sequential layers of material with each fabrication generally comprising both the build or model material 16 and the support or sacrificial material 18. FIG. 2 is a diagrammatic enlarge illustration of the circled area of the composite model 6 shown in FIG. 1.

I. Contact Coating Device for Rapid Deposition of Materials

The present invention is directed to an improved apparatus for the rapid deposition of the build/model and/or the support/sacrificial materials 16, 18 during the fabrication of a three dimensional model, and, in particular, a method and an apparatus which allows the model to be fabricated from an increased range of materials not previously suitable for the layer by layer fabrication of three dimensional models. The increased range of materials may include, for example, materials having greater mechanical strength than previously available materials or having an increased range of temperature tolerance, such as improved high temperature characteristics, and materials containing gold, silver, platinum or other precious and non-precious metals or components having other desired characteristics. Such materials generally comprise a binder of some sort in combination with another component(s), such as ceramic powder or a powdered metal and are often characterized by a high viscosity, e.g., a viscosity in the range of at least 6,000 centipoise and possibly having a viscosity ranging up to 10,000 centipoise or greater. Due to such increased viscosity, such compositions generally can not be delivered or dispense via currently available drop-on-demand deposition devices and/or by currently available rapid deposition devices. It is also desirable that a system, capable of operating with such high viscosity materials, be able to deposit such materials at thicknesses in the range of the conventional build/model and/or support/sacrificial materials of the prior art, particularly when the high viscosity material contains, for example, a precious metal(s), a non-precious metal(s) and/or high viscosity constituents, that the system be capable of depositing such high viscosity materials at rates at least approximating conventional prior art materials, and over regions at least approximating those of conventional prior art systems.

Figure 3:
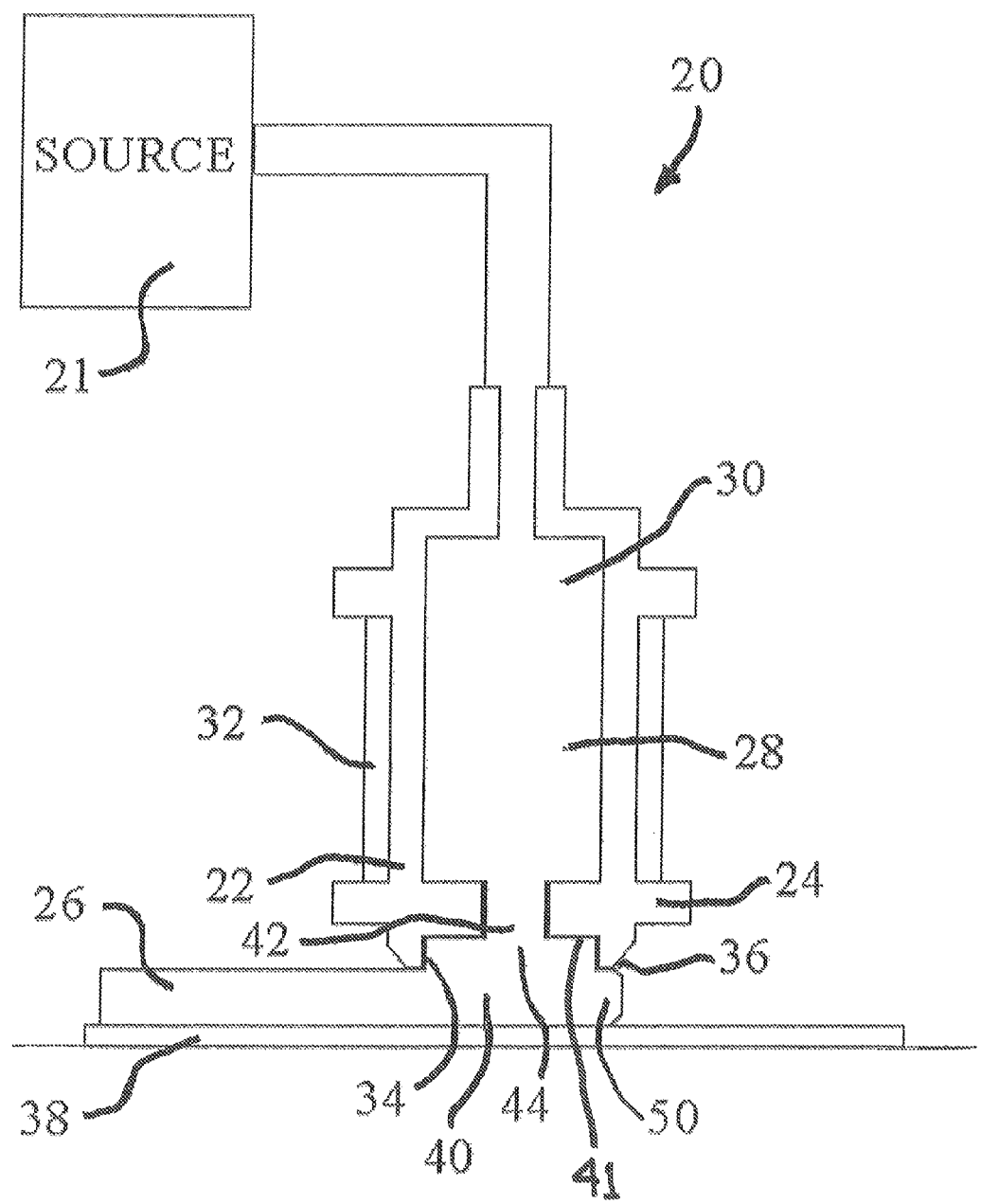
FIGS. 3 and 4 illustrate a basic embodiment of a rapid deposition device for high viscosity materials, a number of alternate and extended embodiments of such a rapid deposition device for high viscosity materials.

Referring now to FIG. 3, a contact coating device 20 (e.g., a high viscosity material deposition device, a high flow deposition device, a high rate deposition device), according to the present invention, is diagrammatically illustrated. The contact coating device 20 is suitable for controllably dispensing build/model and/or support/sacrificial materials 16, 18 at rates approximating or exceeding those of rapid deposition devices currently known in the prior art and utilized for rapid deposition of conventional lower viscosity materials.

The contact coating device 20 generally comprises a high viscosity rapid deposition head 22 which includes a deposition body 24, typically manufactured from metal or some other conductive material, which may have a generally cylindrical transverse cross-sectional shape but also may have any other desired transverse cross sectional shape, e.g., such as square, oval, polygonal, etc., or may comprise an integral part of deposition body 24. As will be discussed further below, the high viscosity rapid deposition head 22 may be vertically movable along a central axis C, defined by the high viscosity rapid deposition head 22, with respect to the layer 26 currently being fabricated, i.e., along the Z-axis. That is, the high viscosity rapid deposition head 22 may be moved either toward or away from the layer 26 currently being fabricated, depending upon the specific implementation of the fabrication system and the tool platform, or the support table 4 may be movable either toward or away from the high viscosity rapid deposition head 22. In addition, and as also described herein above, either the high viscosity rapid deposition head 22, the tool platform 8 and/or the composite model 6 will be laterally movable with respect to the central axis C of the high viscosity rapid deposition head 22 along the X-axis and the Y-axis.

As diagrammatically shown, the interior of the high viscosity rapid deposition head 22 is generally hollow so as to form a material supply passage 28 for the high viscosity material 30 which is supplied from a source 21 of the high viscosity material (only diagrammatically shown). The high viscosity material 30, during dispensing, is conveyed to and forced into and through the high viscosity rapid deposition head 22 by, for example, a pump or a pressure source of a piezoelectric element (not shown in detail in FIG. 3), which is conventionally utilized with respect to rapid deposition devices and drop-on-devices. The supply passage 28 for the high viscosity material 30 may also include, for example, a heating element 32 located along an exterior surface of the supply passage 28 through which the high viscosity material 30 passes when flowing toward the dispensing end of the high viscosity rapid deposition head 22 so as to maintain the high viscosity material 30 at a desired temperature immediately prior to being deposited as part of the layer currently being fabricated. As noted above, the deposition body 24 is typically manufactured from metal or some other conductive material which facilitates conducting heat from the heating element 32 through the deposition body 24 and to the high viscosity material 30 contained within the supply passage 28 to facilitate flow thereof through the deposition body 24.

The material supply passage 28 communicates, via at least one dispensing passage 42, with a material dispensing recess or cavity 44 of the dispensing/shaping nozzle 36 to facilitate the supply of the high viscosity material 30 thereto during dispensing of material from the high viscosity rapid deposition head 22. The deposition end surface 34 of the high viscosity rapid deposition head 22 is generally planar so as to form a material shaping and dispensing surface. The dispensing/shaping nozzle 36 is formed within the deposition end surface 34 and forms a discharge orifice 37 which is designed to dispense a desired quantity of the high viscosity material 30 on the layer currently being fabricated.

Figure 4:
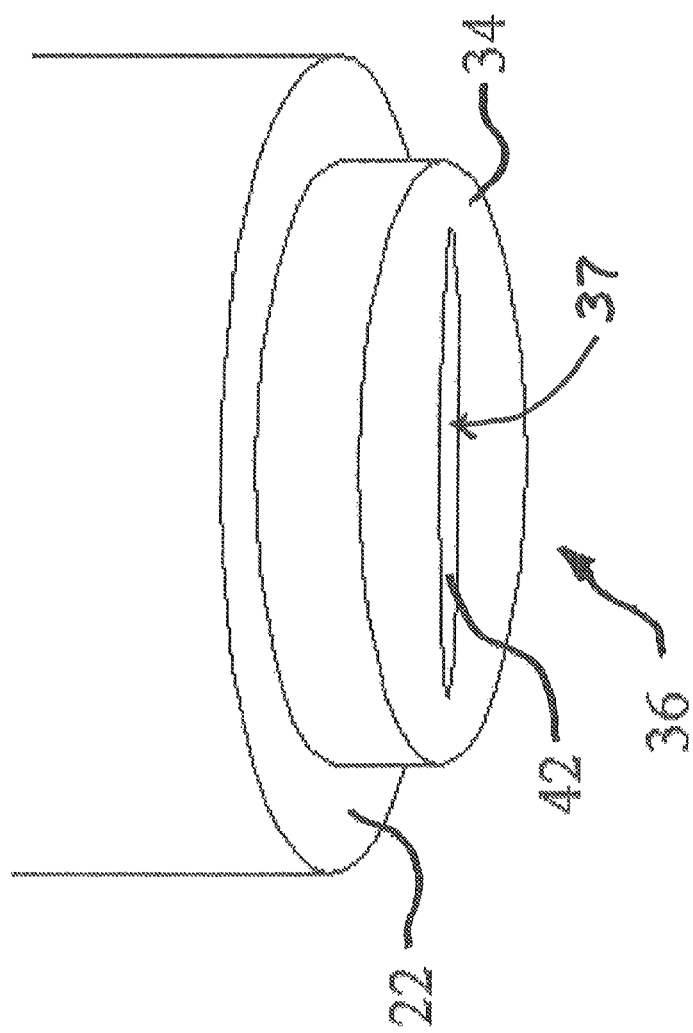
Figure 7:
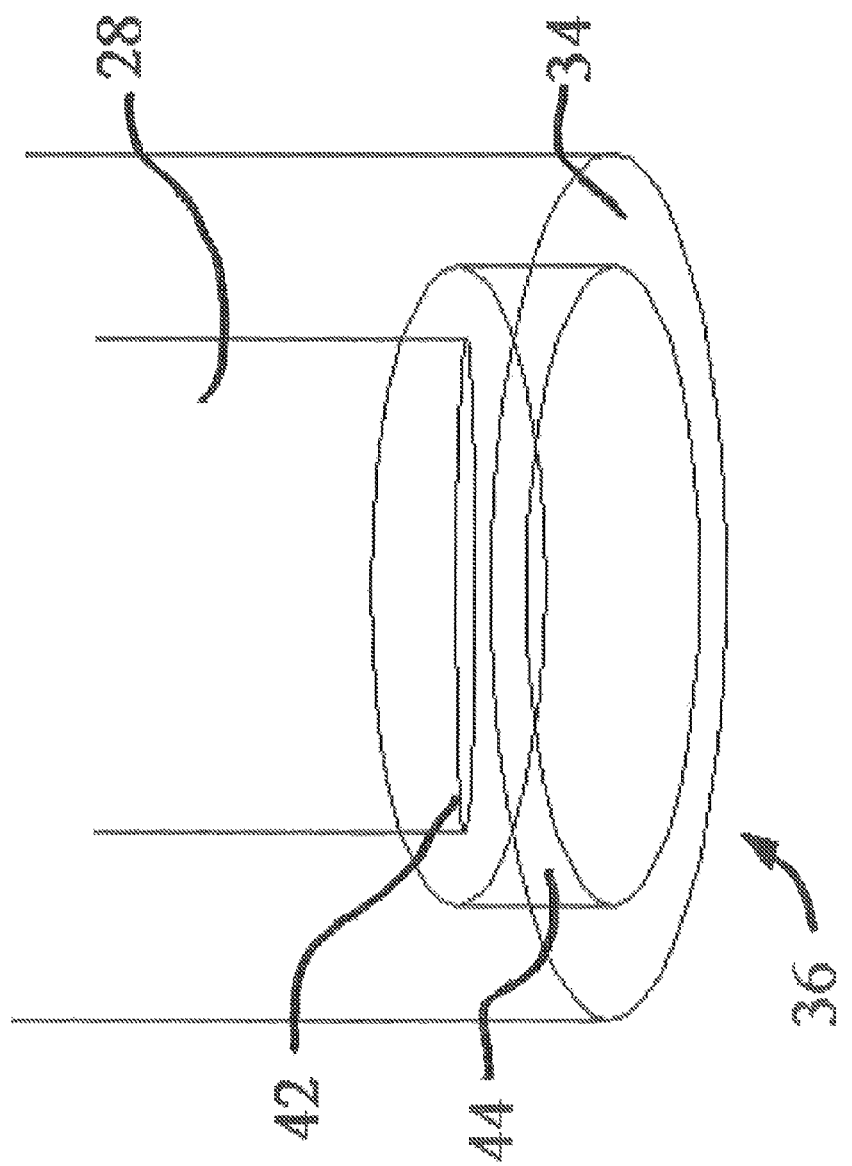

As shown in FIGS. 4 and 7, for example, the dispensing/shaping nozzle 36 generally has a width which extends across a substantial or major portion of a width of the high viscosity rapid deposition head 22 and a length which may extend across a substantial or major portion of a length of the high viscosity rapid deposition head 22. As noted above, at least one generally centrally located dispensing passage 42, formed in a base surface 41 of the material dispensing recess or cavity 44, interconnects or couples the material supply passage 28 with the material dispensing recess or cavity 44 of the dispensing/shaping nozzle 36. As shown in FIG. 4, the dispensing/shaping nozzle 36 comprises a single elongate dispensing slot which extends generally across the entire width of the high viscosity rapid deposition head 22 and the width of the slot is significantly shorter than the length of the slot.

Figure 5:
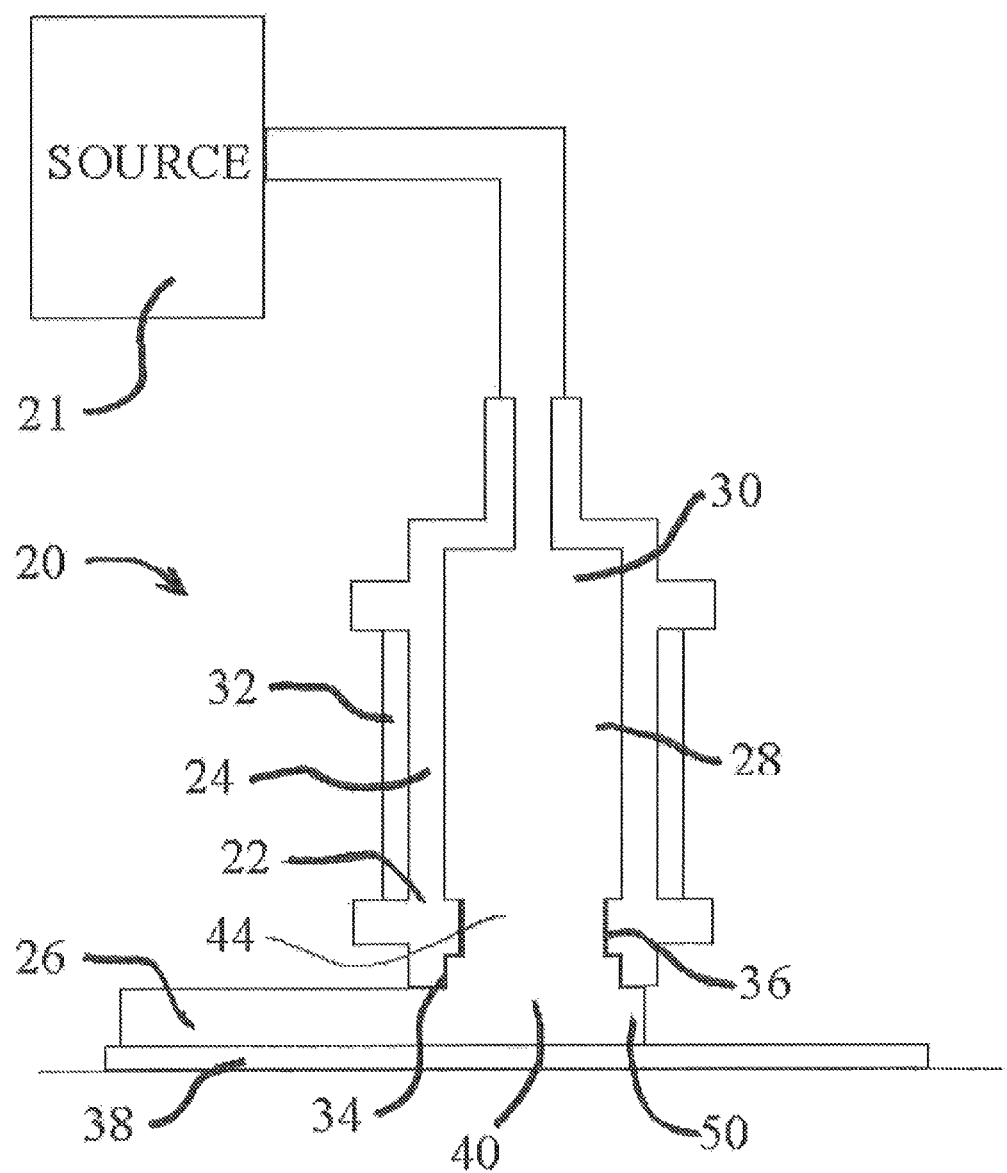
FIG. 5 illustrates a slight modification of the embodiment of the rapid deposition device for high viscosity materials shown in FIG. 3.

Alternatively, as generally illustrated in FIG. 5, the dispensing passage 42 may be partially or completely eliminated so that the material supply passage 28 generally directly communicates with the material dispensing recess or cavity 44 of the dispensing/shaping nozzle 36. As a result of such arrangement, the only notable flow restriction, encountered by the material as such material flows from the material supply passage 28 to the dispensing/shaping nozzle 36, occurs at the dispensing/shaping nozzle 36. Preferably, the material supply passage 28 is adequately sized so as to accommodate a sufficient amount or quantity of material, e.g., the build or model material 16 or the support or sacrificial material 18, which is able to complete fabrication of the layer 26 currently being fabricated.

As is to be appreciated that the dispensing/shaping nozzle 36 may have a variety or alternative shapes or forms, such as an oval, a rectangular, a square, etc., for example, to assist with shaping and controlling the flow and the distribution of the high viscosity material 30 as this material flows out of and is dispensed therefrom across the layer currently being fabricated with the high viscosity material 30. In a typical application, the width of the dispensing/shaping nozzle 36 typically ranges between 0.001 and 0.01 inches and the length of the dispensing/shaping nozzle 36 typically ranges between 0.1 and 0.5 inches. That is, the length of the dispensing/shaping nozzle 36 is typically at least 10 times the width thereof, more preferably the length of the dispensing/shaping nozzle 36 is at least 50 times the width thereof, and most preferably, the length of the dispensing/shaping nozzle 36 is 50 times the width thereof.

As shown in FIG. 3, the perimeter edges, formed between the deposition end surface 34 and the vertical sides of the body of the high viscosity rapid deposition head 22, are rounded, curved or beveled to assist with distribution of any high viscosity material 30 which is extruded through dispensing/shaping nozzle 36 onto the layer 26 currently being fabricated and flows laterally a footprint of the body of the high viscosity rapid deposition head 22. Such rounded, curved or beveled perimeter edges assist with shaping the high viscosity material 30 into a substantially uniform layer having a desired thickness, for the layer 26 currently being fabricated, which is generally free of and does not contain any irregularity or nonuniformity therein.

When the high viscosity material 30 is to be distributed onto a preceding layer 38, the deposition end surface 34 of the high viscosity rapid deposition head 22 will be spaced, relative to the preceding layer 38 onto which the next layer of the high viscosity material 30 is to be deposited, at a desired distance that is at least equal to or preferably slightly greater than, e.g., by about 0.0005 inches or so for example, the intended final thickness of the layer of the high viscosity material 30 to be deposited. For a typical application, the high viscosity rapid deposition head 22 will be positioned such that the deposition end surface 34 thereof is spaced less than six thousandths of an inch (0.006 inch) from the preceding layer 38 upon which the high viscosity material 30 is to be deposited, and more preferably the deposition end surface 34 is spaced to within about three to four thousandths of an inch (0.003 to 0.004 inch) from the preceding layer 38 during material deposition.

As will be discussed further below, the high viscosity rapid deposition head 22 may be secured in a fixed position on the tool platform 8, relative to the position(s) of other material deposition devices, such as one or more drop-by-drop devices or one or more other high deposition rate devices for lower viscosity materials. It will be noted, however, that the required or desired spacing, between the deposition end surface 34 of the high viscosity rapid deposition head 22 and the preceding layer 38, which is to receive the layer of high viscosity material 40 currently being deposited 40, will typically be less than the required or customary spacing between a drop-by-drop deposition device or a lower viscosity rapid deposition device and the preceding layer 38 which is to receive the dispensed material. It may therefore be preferable or necessary, however, to mount the high viscosity rapid deposition head 22, on the tool platform 8, so as to be axially movable with respect to other material deposition devices so that the high viscosity material high viscosity rapid deposition head 22 may be moved to the desired spacing distance, from the preceding layer 38 which is to receive the high viscosity material 30, immediately prior to the high viscosity rapid deposition head 20 starts dispensing the high viscosity material 30 onto the preceding layer 38.

Again referring to FIG. 3, this Figure also shows the operation of the high viscosity rapid deposition head 22, for forming the layer 26 of the high viscosity material currently being fabricated onto the preceding layer 38, following planing thereof. As illustrated, the high viscosity material 30 flows into the material supply passage 28, of the high viscosity rapid deposition head 22. The high viscosity material 30 then flows through a dispensing bore(s) or dispensing passage(s) 42 in to a material dispensing cavity 44 of the dispensing/shaping nozzle 36. Finally, the high viscosity material 30 is dispensed from the dispensing/shaping nozzle 36 onto the preceding layer 38, as high viscosity material 40 so as to form the layer 26 currently being fabricated, in a deposition region located between the preceding layer 38 and the deposition end surface 34.

When operating in the appropriate range of conditions, including a spacing of the deposition end surface 34 of the high viscosity rapid deposition head 22 with respect to the preceding layer 38, the temperature and the viscosity of the high viscosity material 30 and the flow rate and the flow pressure of the high viscosity material 30 through dispensing/shaping nozzle 36, and the rate and the travel direction of the high viscosity rapid deposition head 22 relative to the preceding layer 38, the extruded high viscosity material 30 will form a layer of high viscosity material which is located between the deposition end surface 34, of the high viscosity rapid deposition head 22, and the preceding layer 38.

In a typical application, for example, the high viscosity material may comprise thermal-plastic so that the preferred temperature range of the high viscosity material, when being dispensed from the high viscosity rapid deposition head 22, will typically range between 100 and 200 degrees. The flow rate of the high viscosity material, when extruded from the high viscosity rapid deposition head 22, will typically range between 0.5 and 2 feet/second. The high viscosity rapid deposition head 22 will travel at a rate between 0.5 and 2 feet/second, for example, and the flow pressure of the high viscosity material, extruded from the high viscosity rapid deposition head 22, will typically range between 5 and 10 psi.

As generally shown in FIG. 3, the current layer 26 being fabricated comprises the high viscosity material 40 which occupies the depositing region located between the deposition end surface 34 of the high viscosity rapid deposition head 22 and the preceding layer 38 also and trails behind a travel path of the high viscosity rapid deposition head 22 along the deposition path that has been traversed by the high viscosity rapid deposition head 22, up to that point in time. The high viscosity material deposit 40 may also possibly include a minor excess quantity 50 of the extruded high viscosity material 40 which may accumulate or form along a leading edge of the dispensing/shaping nozzle 36. That is, the excess quantity 50 of the extruded high viscosity material may possibly collect along the front edge of dispensing/shaping nozzle 36 in the travel direction of the high viscosity rapid deposition head 22, in the region between preceding layer 38 and the downwardly facing deposition end surface 34 of the high viscosity rapid deposition head 22. This excess quantity 50 of the extruded high viscosity material, if present, will typically occupy only a portion of a vertical space located between the preceding layer 38 and a main body of the high viscosity rapid deposition head 22 and will preferably not extend significantly past the leading edge of the high viscosity rapid deposition head 22 so as to avoid excessive collection or pooling of the high viscosity material along the travel direction of the high viscosity rapid deposition head 22. In addition, the dispensed high viscosity material 40 will typically avoid collection or pooling on either lateral side of the high viscosity rapid deposition head 22.

During operation, the dispensing/shaping nozzle 36 and the deposition end surface 34 will cooperate with one another and function as a speader tool for shaping and evenly distributing the deposited high viscosity material 40 into a desired high viscosity layer of uniform thickness which is substantially free of any irregularities or non-uniformities in the depositing region, located between the preceding layer 38 and the deposition end surface 34 of the high viscosity rapid deposition head 22, as well as the portion of the previously deposited high viscosity material 30 which trails behind the high viscosity rapid deposition head 22 along the deposition path 48 traversed, up to that point in time, by the high viscosity rapid deposition head 22. During this process, any excess quantity 50 of the extruded high viscosity material 40 will assist with providing any additional source of the high viscosity material for forming the high viscosity material layer in the region between the preceding layer 38 and the deposition end surface 34, thereby assisting with avoiding the formation of any irregularities, skips, voids, undulations and/or imperfections in the deposited layer of the high viscosity material.

As discussed herein above, the high viscosity rapid deposition head 22 may be fixed in position on the tool platform 8 relative to the position of the other material deposition devices, such the drop-by-drop device(s) or some other high deposition rate device(s) for a lower viscosity material(s). The required or desired spacing between the high viscosity rapid deposition head 22, or at least the deposition end surface 34, and the preceding layer 38 which is to receive the deposit of the high viscosity material 40, will typically be less than the required or customary spacing between a drop-by-drop deposition device or a lower viscosity rapid deposition device and the preceding layer 38 which is to receive the material to be dispensed. It may, therefore, be preferable or necessary to mount the high viscosity rapid deposition head 22 so as to be axially positionable or movable with respect to other material deposition devices, supported by the tool platform 8, so as to avoid interference between the operation of the high viscosity rapid deposition head 22 and the operation of the other material deposition devices. In this manner, the high viscosity rapid deposition head 22 may be periodically moved to the desired contact coating distance from the preceding layer 38, when the high viscosity rapid deposition head 22 is to deposit the high viscosity material 30 onto the preceding layer 38, while the high viscosity rapid deposition head 22 may be retracted or moved away from the preceding layer 38, when not operating, so as to avoid interference with operation of one or more other material dispensing device(s).

Figure 6:
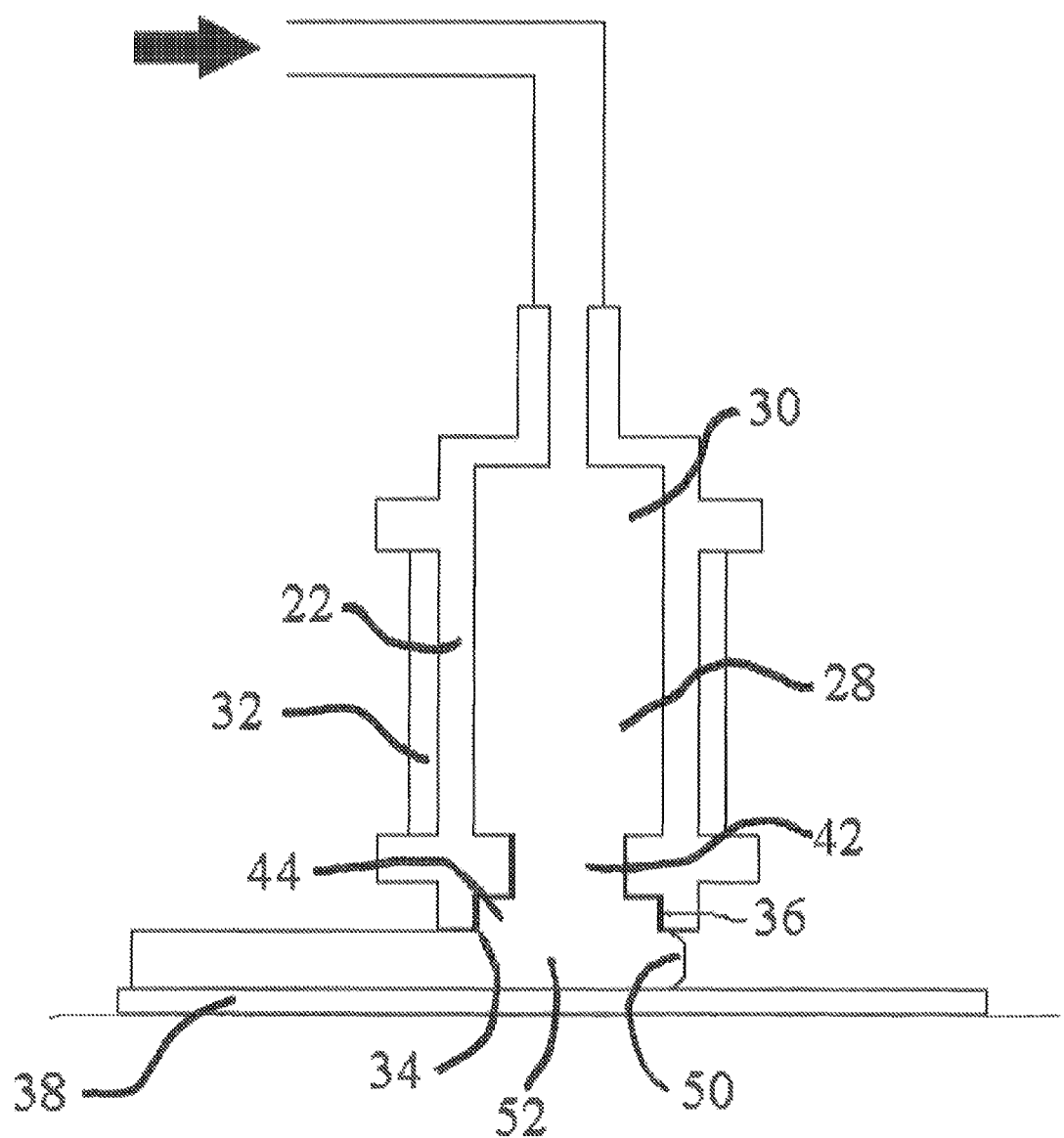
FIGS. 6 and 7 illustrate a further embodiment of a rapid deposition device for high viscosity materials.

Turning now to FIGS. 6 and 7, an alternate embodiment of the high viscosity rapid deposition head 22, for dispensing the high viscosity materials 30, will now be discussed. According to this embodiment, the deposition end surface 34 is formed flush and coincident with a leading end surface of the high viscosity rapid deposition head 22. That is, the deposition end surface 34 and the dispensing/shaping nozzle 36 do not project or extend axially from a leading surface of the main body of the high viscosity rapid deposition head 22, but are entirely accommodated within the leading surface of the high viscosity rapid deposition head 22. As with the embodiment of FIG. 3, the material supply passage 28 communicates, via the dispensing passage 42, with the material dispensing cavity 44 and the dispensing/shaping nozzle 36 to facilitate the supply of the high viscosity material 30 thereto during operation. The deposition end surface 34, of the high viscosity rapid deposition head 22, is coincident with the leading end of the main body of the high viscosity rapid deposition head 22. That is, the dispensing orifice of the dispensing/shaping nozzle 36, the deposition end surface 34 of the high viscosity rapid deposition head 22 and the leading surface of the main body of the high viscosity rapid deposition head 22 are each aligned and coplanar with one another.

As with the previous embodiment, the dispensing/shaping nozzle 36 comprises a material dispensing recess or cavity 44 which is designed to hold a desired quantity of the high viscosity material 30 to be dispensed. The dispensing/shaping nozzle 36 generally has a width which extends substantially across the entire width, or a major portion of the width, of the high viscosity rapid deposition head 22 and a length which extends across a portion of the length of the high viscosity rapid deposition head 22, e.g., the length is typically less than the width. The dispensing/shaping nozzle 36 also comprises at least one generally centrally located dispensing passage 42 which interconnects the material supply passage 28 with the material dispensing cavity 44 of the dispensing/shaping nozzle 36 and the material supply passage 28 is supplied with the high viscosity material, as generally described above.

As shown, the material dispensing cavity 44 generally has a circular, oval or elongate cross sectional shape and receives the high viscosity material 30, conveyed from material supply passage 28, for dispensing by the dispensing/shaping nozzle 36. According to this embodiment, the dispensing/shaping nozzle 36 and the material dispensing cavity 44 both have length and/or width dimensions in the range of between 0.1 and 0.05 inches while the material dispensing cavity 44 has a depth in the range of between 0.005 and 0.01 inches. As discussed further below, an outlet of the dispensing passage(s) 42 is preferably spaced from the preceding layer 38 by a distance and that is typically utilized for drop-by-drop deposition of material, for example, onto the preceding layer 38 so that such dispensing passage(s) 42 may be utilized, if desired, to facilitate drop-on-demand dispensing of the material onto the preceding layer 38.

According to one application, the dispensing passage(s) 42 of the high viscosity rapid deposition head 22 may comprise a single dispensing slot. Alternatively, it may comprise a variety of other shapes or forms such as, for example, a straight slot having a constant width, an oval shape, an X shape arrangement, or may comprise one of more dispensing holes or apertures arranged in any of a plurality of other alternative patterns, including a line, an array or have configurations similar to a dispensing slot, a circular pattern, etc., without departing from the spirit and scope of the present invention.

As with the previous embodiments, the outlet of the dispensing/shaping nozzle 36 of the high viscosity rapid deposition head 22 is located at the lowest vertical point of the high viscosity rapid deposition head 22, relative to the surface of the preceding layer 38. Preferably, the interfaces between the deposition end surface 34 and the upwardly extending sidewall surfaces of the high viscosity rapid deposition head 22 are rounded, curved or beveled. It will also be noted that dispensing orifice of the dispensing/shaping nozzle 36 is spaced from the outlet of dispensing passage(s) 42 by a depth which is equal to the depth of the material dispensing cavity 44.

Turning again to FIG. 6, operation of the high viscosity rapid deposition head 22, for depositing the high viscosity material 30 onto the preceding layer 38, will now be discussed. The high viscosity material 30 flows from material supply passage 28, of the high viscosity rapid deposition head 22, through dispensing passage(s) 42 into the material dispensing cavity 44 of the high viscosity rapid deposition head 22. During operation of the high viscosity device rapid dispensing head 22, the material dispensing cavity 44 is typically completely filled with the high viscosity material 30. The high viscosity material 30 then flows, as needed and as determined by the material viscosity, the pumping rate and the supply pressure of the high viscosity material 30, out through the dispensing/shaping nozzle 36 into the material deposition region 52 located between the deposition end surface 34 of the high viscosity rapid deposition head 22 and the preceding layer 38 receiving the high viscosity material 30 being deposited.

The dispensing/shaping nozzle 36 and the deposition end surface 34 of the high viscosity rapid deposition head 22 together cooperate and function with one another as a spreading tool for shaping and spreading the deposited high viscosity material 30 into a desired layer of high viscosity material currently being fabricated 40 which has a uniform thickness which is generally free of any irregularities in the depositing region located between the end surface 34 and the preceding layer 38. During this process, the material dispensing cavity 44 will provide a reserve source of the high viscosity material 30 for forming the layer of high viscosity material currently being fabricated 40 which is deposited in the region between the deposition end surface 34 and the preceding layer 38, thereby assisting with avoiding the formation of any irregularities, skips, voids, undulations and/or imperfections in the layer 26 of high viscosity material currently being fabricated.

As described above, it may be preferable or necessary to mount the high viscosity rapid deposition head 22 so as to be axially movable with respect to other material deposition devices and/or the tool platform 8 so as to avoid interference with operation of one or more other material deposition devices. In this manner, again, the high viscosity rapid deposition head 22 may be movable into a desired spacing from the preceding layer 38, which is to receive the high viscosity material 30, when the high viscosity rapid deposition head 22 is to deposit the high viscosity material 30 onto a preceding layer 38 and retracted, when not in use, so as to avoid interference with one or more of the other material devices.

Figure 8:
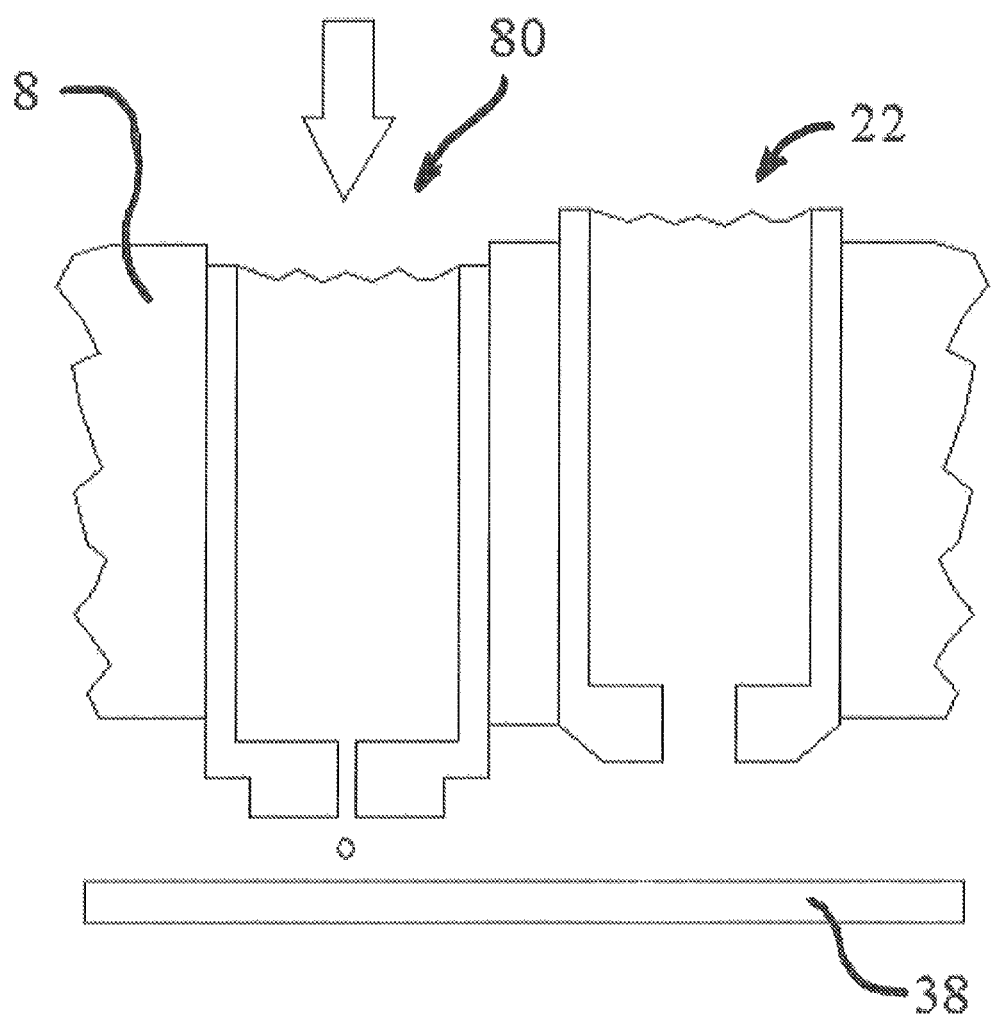
Figure 9:
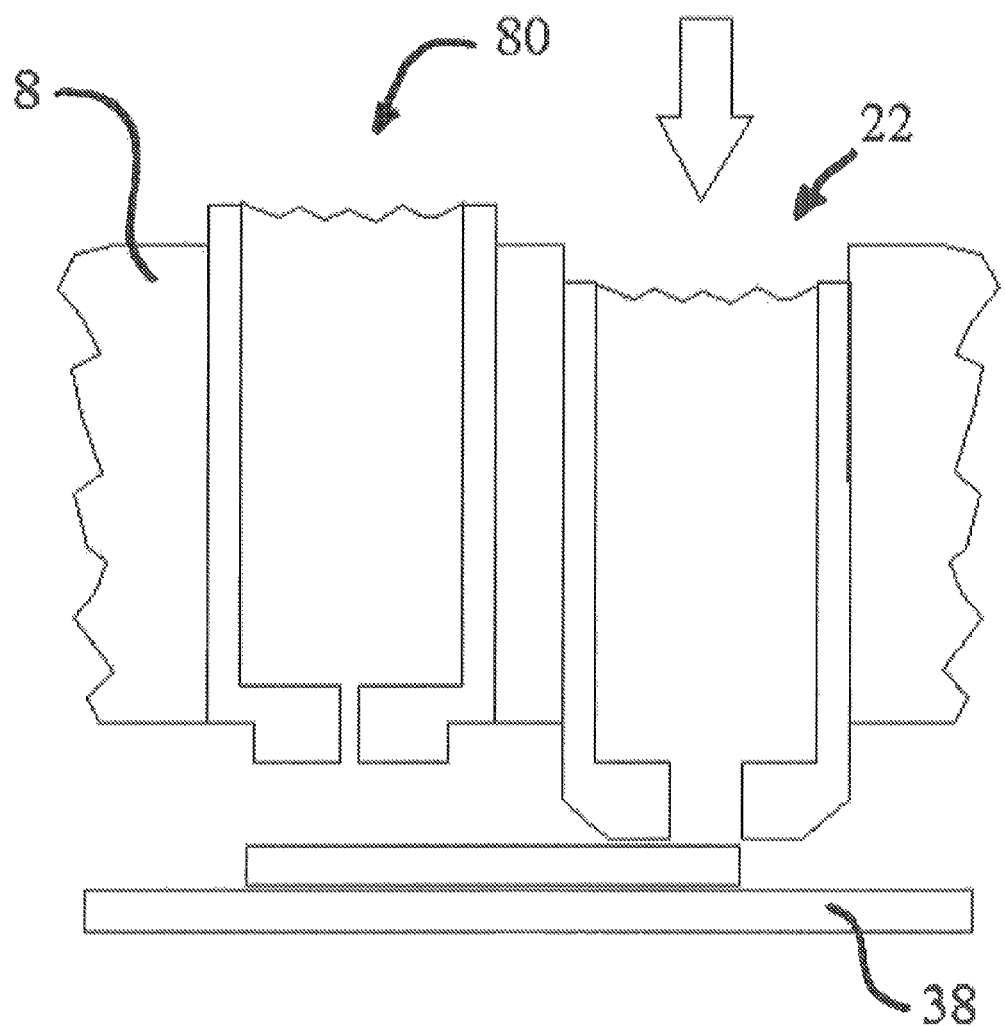
FIG. 9 illustrates the high viscosity rapid deposition head in a dispensing position located closely adjacent to the preceding layer.

Turning now to FIGS. 8 and 9, additional features of the high viscosity rapid deposition head 22 mounted to an exemplary tool platform, such as a tool platform 8, are shown and will now be described. FIG. 8 illustrates the high viscosity rapid deposition head 22 in a retracted position, space from preceding layer 38, while the drop on demand device 80 is shown in a slightly extended position. FIG. 9, on the other hand, illustrates the high viscosity rapid deposition head 22 in a dispensing position located closely adjacent to the preceding layer 38, while the drop on demand device 80 is shown in a slightly retracted position. As shown in FIG. 8, the high viscosity rapid deposition head 22 is shown in its retracted position, relative to the tool platform 8 and the other dispensing device, e.g., a drop-on-demand device 80, so as not to interfere with dispensing of material by that dispensing device. FIG. 9, on the other hand, shows the high viscosity rapid deposition head 22 in its extended in-use contact coating position, relative to the tool platform 8 and the other dispensing device, e.g., a drop-on-demand device 80, so that the high viscosity rapid deposition head 22 is located closely adjacent the previous layer 38 to facilitate depositing the high viscosity material thereon.

Multi Head Deposition Devices

It is often preferable or necessary for a system to have a plurality of different types of material deposition devices, such a pair of drop-by-drop deposition devices in addition to a high viscosity material deposition device and possibly also another high deposition rate device for lower viscosity materials, such as a spray device. In certain implementations of such a system, there may be separate material deposition devices for each type of material deposition to be accommodated by the fabrication system, such as a drop-by-drop device and a high deposition rate device, such as a spray device, for low viscosity materials and a high viscosity material deposition device, as described herein, with all of the material deposition devices being mounted on one or more tool platforms as described herein above. In some embodiments, the high viscosity rapid deposition head or device 22 is mounted axially so as to avoid interference with the other material deposition devices.

In other embodiments of the system and the high viscosity rapid deposition device 22, it may be preferable to provide a combined, multi-function material deposition device comprising the contact coating device 20 with one or both of a drop-by-drop deposition device and a high deposition rate device for low viscosity materials, such as a spray device.

Figure 10:
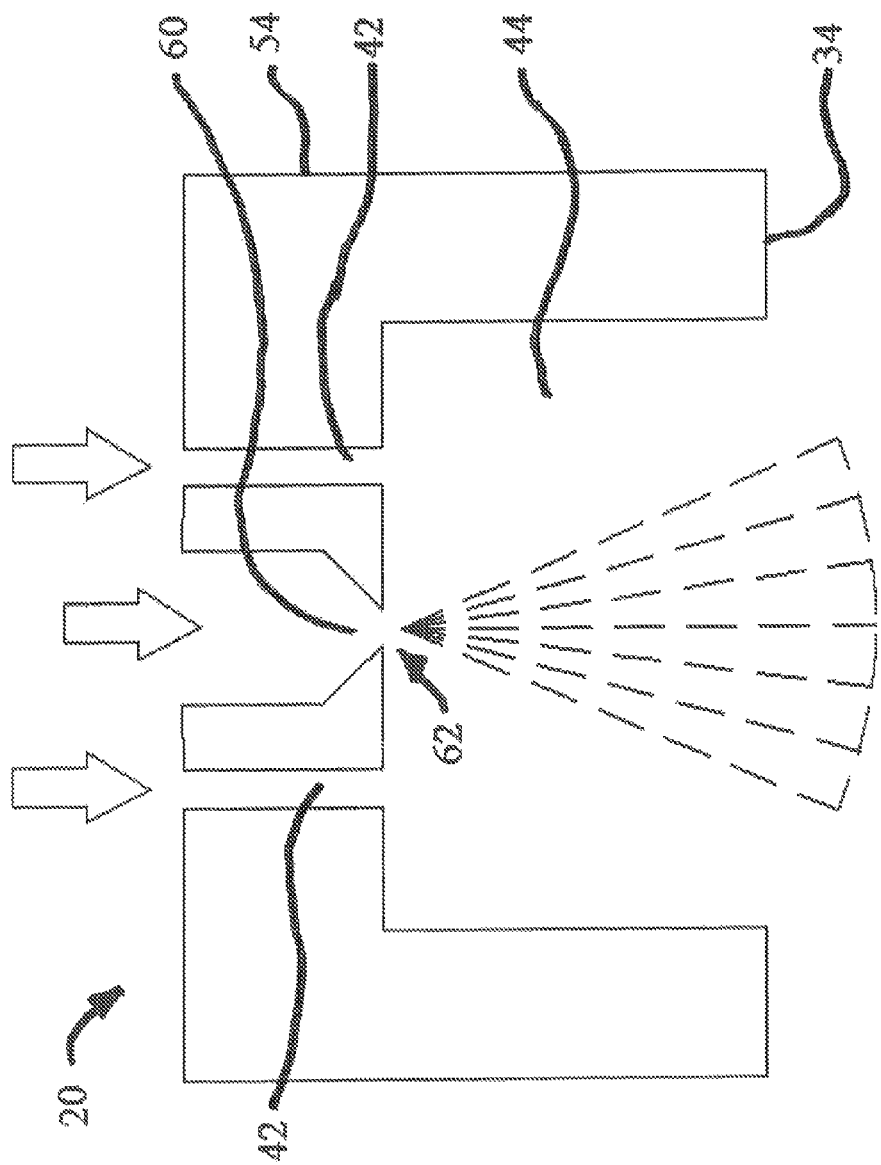
FIG. 10 diagrammatically illustrates a further embodiment in which the dispensing head is equipped to provide both rapid and drop-on-demand dispensing of a material.
Figure 11:
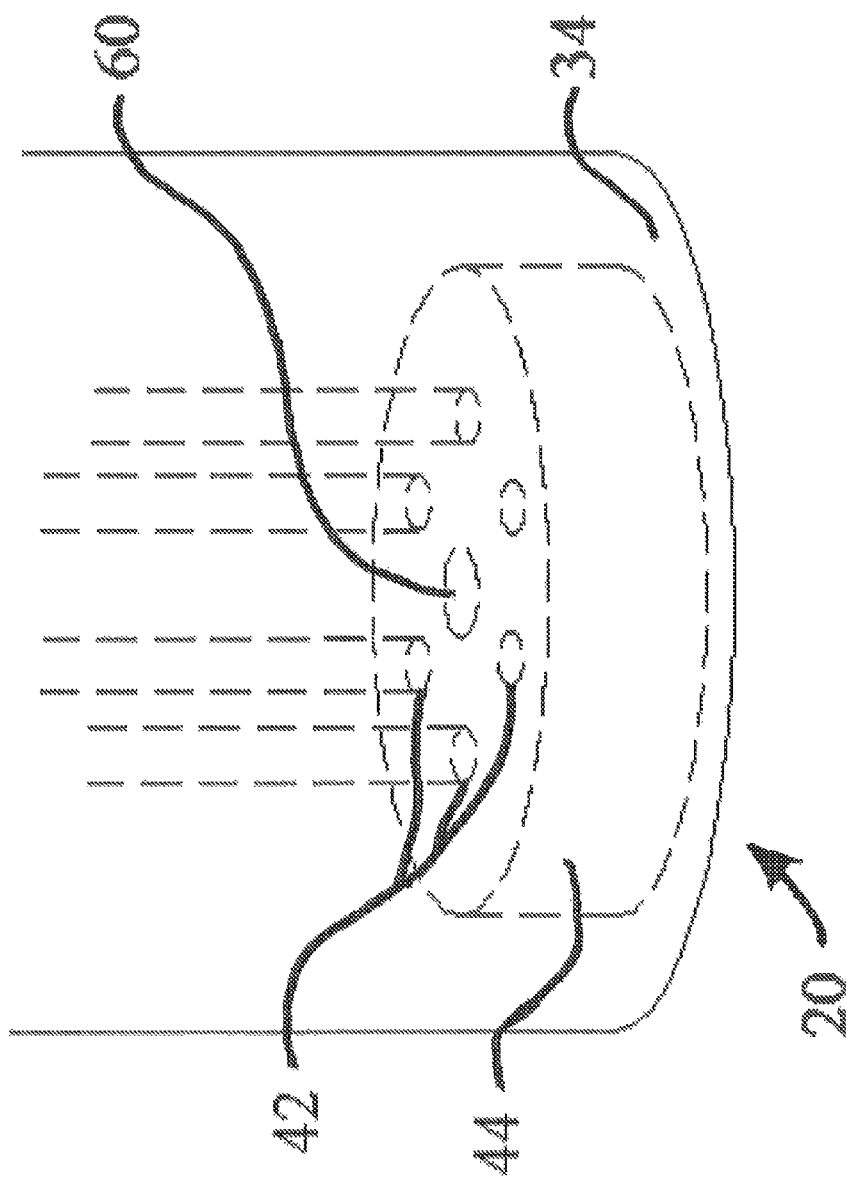
FIG. 11 diagrammatically illustrates a second embodiment the dispensing head is equipped to provide both rapid and drop-on-demand dispensing of a material.
Figure 12:
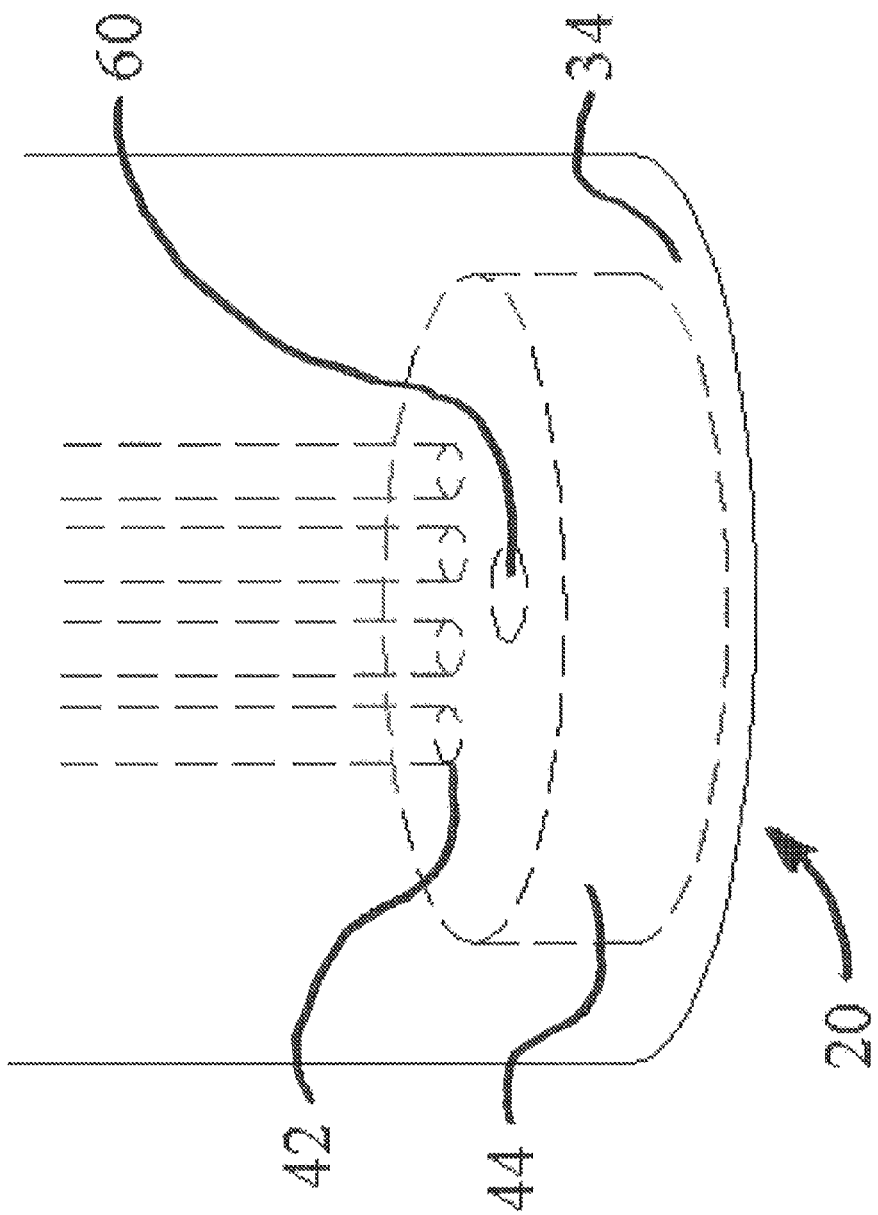
FIG. 12 diagrammatically illustrates a third embodiment the dispensing head is equipped to provide both rapid and drop-on-demand dispensing of a material.

FIGS. 10, 11 and 12 diagrammatically illustrate an exemplary embodiment of a contact coating device 20 comprising a combined high viscosity rapid deposition head 54 incorporating both a high viscosity material high viscosity rapid deposition head 56 and at least one alternate deposition device 58, such as a drop-on-demand device or a rapid deposition spray device.

As shown therein, the combined high viscosity rapid deposition head 54 comprises a high viscosity rapid deposition head 56 which is generally similar to the high viscosity rapid deposition head 22 described and discussed above. As described above, the deposition end surface 34 of the combined high viscosity rapid deposition head 54 is spaced from the outlet of dispensing passage(s) 42 by the depth of the material dispensing cavity 44 so that deposition end surface 34 may thereby be located at the preferred distance from the preceding layer 38, that is, by less than six thousandths of an inch (0.006 inch) and preferably to within about three to four thousandths of an inch (0.003 to 0.004 inch) of the preceding layer 38 to facilitate contact coating. For example, the material dispensing cavity 44 typically has length and/or width dimensions in the range of between 0.1 and 0.5 inches while the material dispensing cavity 44 typically has a depth the range of between 0.005 and 0.01 inches. The spacing of the dispensing passage(s) 42, from the preceding layer 38, when dispensing material on a drop-by-drop basis, is typically between 0.05 and 0.1 inches. As discussed below in further detail, at least one of the outlet or dispensing passage(s) 42 is located at a distance from the preceding layer 38 on the order that is typically for a drop-by-drop dispensing head or a spray device head, e.g., a drop-on-demand device 58.

According to the present invention, and as illustrated in FIGS. 9 and 10, while the deposition end surface 34, for dispensing the high viscosity material 30 is located at the preferred spacing from the preceding layer 38 for depositing and shaping the layer 26 of high viscosity material currently being fabricated, at least one of the dispensing passage(s) 60, which is sized for dispensing drops suitable for drop-by-drop dispensing, is thereby spaced at the desired distance from the preceding layer 38 so as to facilitate drop-by-drop deposition of the material onto the preceding layer 38, without having to alter the position of combined high viscosity rapid deposition head 54 with respect to the preceding layer 38.

As indicated in the illustrative examples of FIGS. 10, 11 and 12, the configuration and spacing requirements of the combined high viscosity rapid deposition head 54, when such head is to be utilized as a drop-by-drop device 58, may corresponding require suitable adjustment of the location of the high viscosity material passage or passages 42 respect to the preceding layer 38. For example, the drop-by-drop dispensing passage 60 may be located along the central axis C of the high viscosity rapid deposition head 22 while a plurality of other high viscosity material dispensing passages 42 may be distributed circumferentially around and about the central axis C and circumferentially around the drop-by-drop dispensing passage 60. Alternatively, the drop-by-drop dispensing passage 60 may be spaced from the central axis of the high viscosity rapid deposition head 22 while the dispensing passage(s) 42 comprises an elongate slot which is coincident with the central axis C of the high viscosity rapid deposition head 22.

According to the present invention, the combined high viscosity rapid deposition head 54 is equipped with both high viscosity rapid deposition head 56 as well as a drop-by-drop dispensing head 58. The high viscosity rapid deposition head 56 comprises a material dispensing cavity 44 and has one or more rapid dispensing passages 42 which communicate therewith, while the drop-by-drop dispensing passage comprises a single drop-by-drop dispensing passage 60 which facilitates drop-by-drop dispensing of material. All of the rapid dispensing passages 42 and the drop-by-drop dispensing passage 60 are formed in a wall which forms a partition between the material supply passage 28 and the material dispensing cavity 44. As a result of such arrangement, the combined high viscosity rapid deposition head 54 may be used for either rapid deposition of the high viscosity material 30 or drop-by-drop deposition of the high viscosity material 30 on the preceding layer 38, as desired or required for the particular application. It will also be recognized that the use of the combined high viscosity material deposition device 54 eliminates, or significantly reduces, the required spatial relationship adjustments between the combined high viscosity material deposition device 54 and the preceding layer 38 when switching back and forth from the rapid deposition process to the drop-by-drop deposition process, and vice versa.

It will also be appreciated that the accumulation of the residual high viscosity material 30, in the material dispensing cavity 44, may require removal or purging of such high viscosity material 30 prior to using the combined high viscosity rapid deposition head 54 as a drop-by-drop dispensing head 58. The purging of the residual high viscosity material 30, from the material dispensing cavity 44, may be performed in a number of ways, such as mechanically, for example, by a high frequency vibration of at least the material dispensing cavity 44 of the combined high viscosity rapid deposition head 54. Alternately, the material dispensing cavity 44 may be cleaned of the residual high viscosity material 30 by dispensing an appropriate solvent through dispensing passage 60 or the dispensing passage(s) 42, or by translation to and immersion of the combined high viscosity rapid deposition head 54 in a solvent bath (not shown) located adjacent to the workpiece support table 4. Alternatively, air can be supplied to the dispensing passage 60 to adequately clean and/or clear a drop-by-drop dispensing path of the residual high viscosity material 30 contained within the material dispensing cavity 44.

As diagrammatically illustrated in FIGS. 10, 11 and 12, the combined high viscosity rapid deposition head 54 may be constructed in a manner similar to that described above, but with a rapid deposition spray head 62 being utilized in place of the drop-by-drop dispensing head 58. As with the drop-by-drop dispensing head 58, a dispensing spray passage for the rapid deposition spray head 62 is accommodated within the wall which partitions or separates the material supply passage 28 from the material dispensing cavity 44. Again, the configuration and space requirements for inclusion of the rapid deposition spray head 62, in the combined high viscosity rapid deposition head 54, may require corresponding adjustments in the location of the high viscosity material dispensing passage 60. For example, the dispensing spray passage 60 may be located along the central axis C of the combined high viscosity rapid deposition head 54 while a plurality of other high viscosity material dispensing passages 42 may be distributed circumferentially around the central axis C and circumferentially around the dispensing spray passage 60. Alternatively, the dispensing spray passage 60 may possibly be spaced from the central axis C of the high viscosity rapid deposition head 22 while the dispensing passage 42 comprises an elongate slot which is coincident with the central axis of the high viscosity rapid deposition head 22. It will also be appreciated that the accumulation of the residual high viscosity material 30, in the material dispensing cavity 44, will typically require removal or purging of the residual high viscosity material 30 prior to using the combined high viscosity rapid deposition head 54 as a rapid deposition spray head 62. In any event, it will be appreciated that the configuration and dimensions of the material dispensing cavity 44 must accommodate the spray pattern emitted by and from rapid deposition spray passage 60 when utilized as rapid deposition spray head 62.

Figure 13:
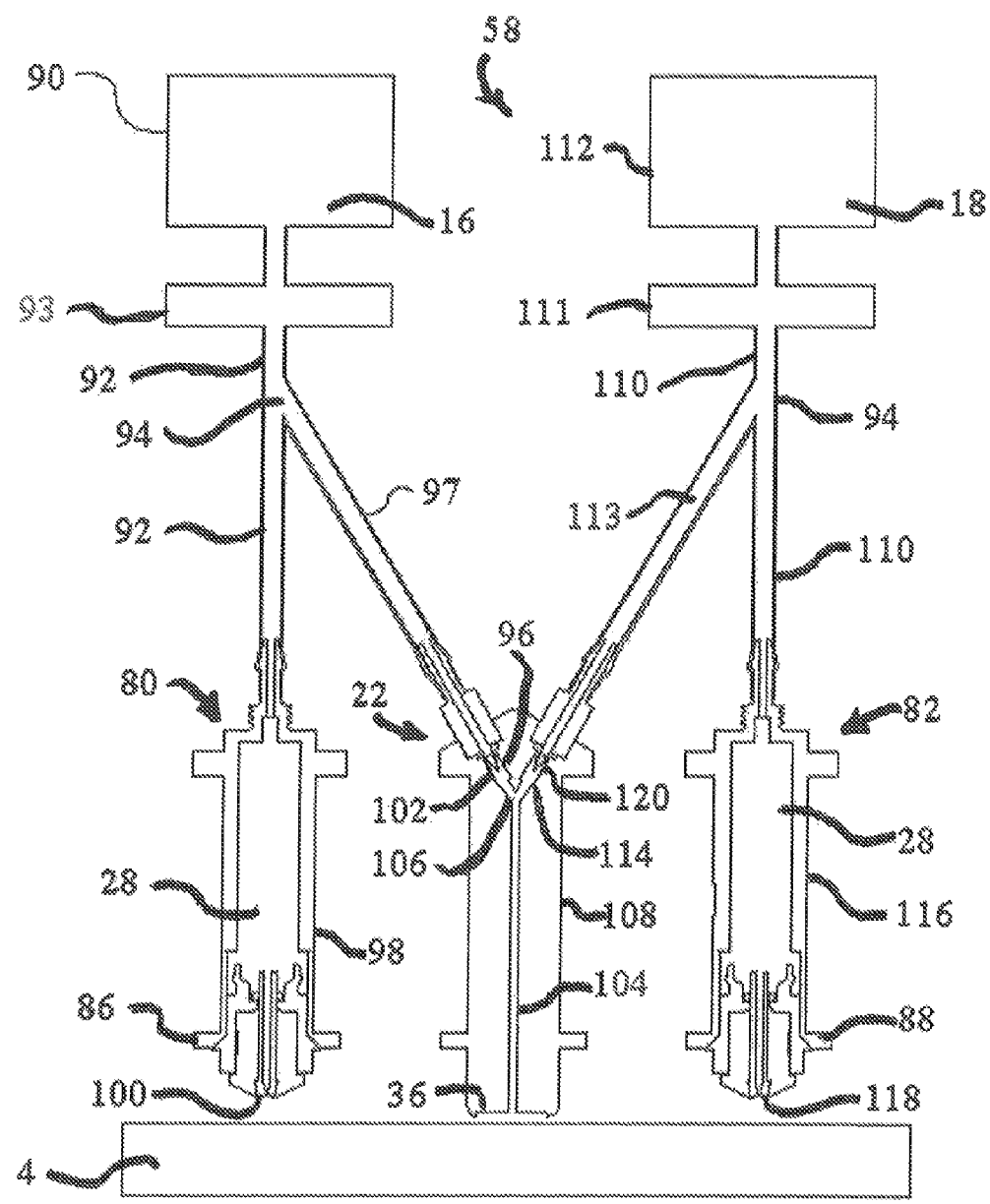
FIG. 13 is a diagrammatic illustration of a multi-head material deposition system comprising separate first and second drop-on-demand devices and a common high viscosity rapid deposition head.

Turning now to FIG. 13, an exemplary embodiment of a system comprising separate first and second drop-on-demand devices 80, 82 as well as a common high viscosity rapid deposition head 22. Each of the first and the second separate drop-on-demand devices 80, 82 incorporates a conventional drop-on-demand printhead 86, 88, and the drop-on-demand printheads 86, 88 are integrated in first and second drop-on-demand devices 80, 82 as described in further detail in U.S. Pat. No. 7,700,016, and such teaching is incorporated herein by reference.

The first drop-on-demand device 80 comprises a first main supply conduit 92 for supplying the model material 16, via a model material pump 93 (only diagrammatically shown), from a model material supply source 90 toward the first drop-on-demand device 80. The first main supply conduit 92 includes an inverted Y-coupling 94 which divides the flow of the model material 16, supplied via the first main supply conduit 92, into first and second separate and distinct flow streams. The first flow stream continues to flow along the first main supply conduit 92 into the internal material supply passage 28 of the first drop-on-demand device 80, while the second flow stream flows, via a first branch supply conduit 97, to a first inlet 96 of the common high viscosity rapid deposition head 22.

The internal material supply passage 28, of the first drop-on-demand device 80, directly communicates with the first drop-on-demand printhead 86 to facilitate supplying the model material 16 thereto and dispensing of the model material 16, as required or desired by the system, in a conventional drop-by-drop manner. A first heater element/thermal valve 98 typically surrounds an exterior portion of the body of the first drop-on-demand device 80 to facilitate controlling the flow of material through the first drop-by-drop dispensing nozzle 100. As is conventional in the art, when the first thermal valve 98 is cooled, this permits the model material 16, contained within the first drop-by-drop dispensing nozzle 100 and adjacent the first thermal valve 98, to solidify and thereby interrupt and discontinue the flow of material through the first drop-by-drop dispensing nozzle 100 while, when the first thermal valve 98 is heated, this permits the model material 16 contained within the first drop-on-demand device 80 to liquefy and thereby facilitate drop-by-drop dispensing of such model material 16 through the first drop-by-drop dispensing nozzle 100.

A first one-way flow valve 102 (e.g., a duckbill check valve for example) is located at, or adjacent, the first inlet 96 to the common high viscosity rapid deposition head 22 for permitting the flow of model material 16 into the common high viscosity rapid deposition head 22 in only one flow direction, namely, from the first branch supply conduit 97 toward a centrally located common supply line 104 which is accommodated within the common high viscosity rapid deposition head 22 and communicates with the dispensing/shaping nozzle 36 thereof. A standard Y-coupling 106 facilitates coupling of the first branch supply conduit 97 with the common supply line 104.

A second heater element/thermal valve 108 typically surrounds an exterior portion of the body of the common high viscosity rapid deposition head 22 to facilitate controlling the flow of material through the dispensing/shaping nozzle 36. As is conventional in the art, when the second thermal valve 108 is cooled, this permits the material, flowing along the common supply line 104 and located adjacent the second thermal valve 108, to solidify and thereby interrupt and discontinue the flow of material through the dispensing/shaping nozzle 36 of the common high viscosity rapid deposition head 22. On the other hand, when the second thermal valve 108 is heated, this permits the material contained within the common supply line 104 and located adjacent the second thermal valve 108 to liquefy and thereby facilitate rapid dispensing of the material from the dispensing/shaping nozzle 36.

The second drop-on-demand device 82 comprises a second main supply conduit 110 for supplying the sacrificial material 18, via a model material pump 111 (only diagrammatically shown), from a sacrifical material supply source 112 toward the second drop-on-demand device 82. The second main supply conduit 110 also includes an inverted Y-coupling 94 which divides the flow of the sacrificial material 18, supplied via the second main supply conduit 110, into first and second separate and distinct flow streams. The first flow stream continues to flow along the second main supply conduit 110 into the internal material supply passage 28 of the second drop-on-demand device 82, while the second flow path flows, via a second branch supply conduit 113, to a second inlet 114 of the common high viscosity rapid deposition head 22.

The internal material supply passage 28, of the second drop-on-demand device 82, directly communicates with the second drop-on-demand printhead 88 to facilitate supplying the sacrificial material 18 thereto and dispensing of the sacrificial material 18, as required or desired by the system, in a conventional drop-by-drop manner. A third heater element/thermal valve 116 typically surrounds an exterior portion of body of the second drop-on-demand printhead 88 to facilitate controlling the flow of material through the second drop-by-drop dispensing nozzle 118. As is conventional in the art, when the third thermal valve 116 is cooled, this permits the material contained within the second drop-by-drop dispensing nozzle 118 and located adjacent the third thermal valve 116 to solidify and thereby interrupt and discontinue the flow of the sacrificial material 18 through the second drop-by-drop dispensing nozzle 118. On the other hand, when the third thermal valve 116 is heated, this permits the material contained within the second drop-on-demand printhead 88 and located adjacent the third thermal valve 116 to liquefy and thereby facilitate drop-by-drop dispensing of such material.

A second one-way flow valve 120 (e.g., a duckbill check valve for example) is located at, or adjacent, the second inlet 114 to the common high viscosity rapid deposition head 22 for permitting the flow of sacrificial material 18 into the common high viscosity rapid deposition head 22 in only one flow direction, namely, from the second branch supply conduit 113 toward the common supply line 104 which communicates with the dispensing/shaping nozzle 36 of the common high viscosity rapid deposition head 22. The standard Y-coupling 106 facilitates coupling of the second branch supply conduit 113 with the common supply line 104. As discussed above, the second thermal valve 108 is located along the common supply line 104 of the common high viscosity rapid deposition head 22 for controlling the flow of material, e.g., either model material 16 or sacrificial material 18, through the dispensing/shaping nozzle 36.

Each one of the first, the second, and the third thermal valves 98, 108, 116 generally comprises both a heating element and a material temperature sensor (not shown in detail) which facilitate thermal control of the temperature of the material flowing along either the first drop-on-demand device 80, the second drop-on-demand device 82 or the common high viscosity rapid deposition head 22, and thereby controls the temperature of the material flowing through the associated nozzle. It is to be appreciated that controlling the temperature of the material flow path within the respective deposition head, and hence the material itself, has two distinct purposes, namely, this ensures that the physical properties of the material, which are affected by temperature, are suitably controlled and, secondly, serves to enable or disable the associated drop-by-drop dispensing.

According to the present invention, the orientation and spacing of the contact coating device 20 with respect to the support table 4 is controllable. In the embodiment shown in FIG. 13, the multi-head material deposition system 66 moves or operates in a plane which lies parallel to the support table 4. However, it should be noted that there may be certain circumstances in which it is advantageous to align the preceding layer 38, via modification of the support table 4, at a desired orientation with respect to the plane in which the multi-head material deposition system 66 is movable with respect to the support table 4.

Figure 14:
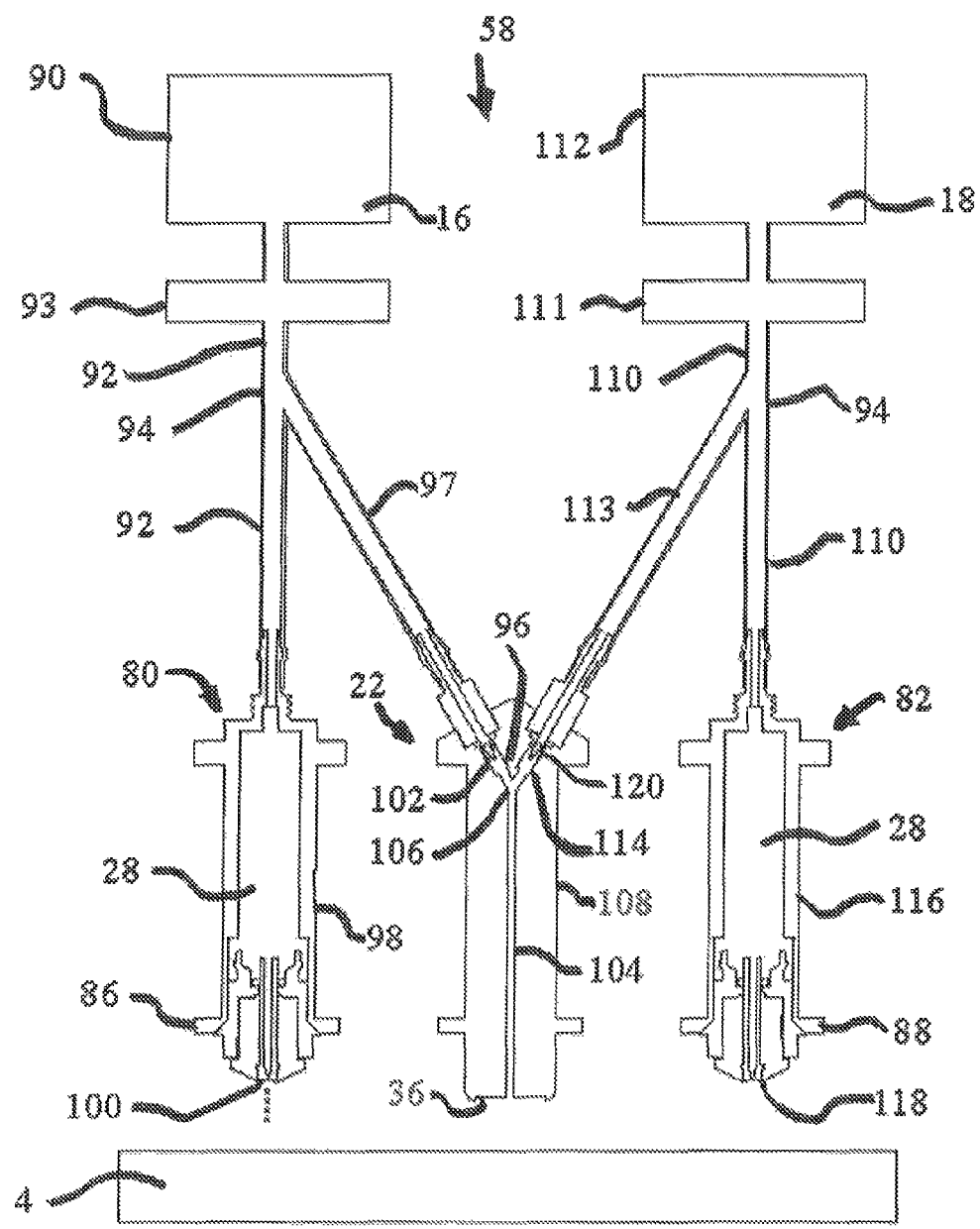
FIG. 14 is a diagrammatic illustration of the system of FIG. 13 showing dispensing of the model material on a drop-by-drop basis.

FIG. 14 diagrammatically shows a normal print operating mode of the multi-head material deposition system 66 and a discussion concerning such operating mode will now be provided. During this normal print operating mode, both the model material pump 93 and the sacrificial material pump 111 are deactivated. A peizoelectric element is located adjacent the discharge outlet (e.g., the first drop-on-demand printhead 86) of the first drop-on-demand device 80 and this peizoelectric element acts as a pump to eject droplets of the model material 16, as desired. The model material 16 is supplied along the first main supply conduit 92, via the first flow stream, into the internal material supply passage 28 of the first drop-on-demand device 80 and communicates with the peizoelectric element. Additionally during this mode, both the second and the third thermal valves 108, 116 are in a cooled state which thereby prevent the flow of the material through the common high viscosity rapid deposition head 22 and the second drop-on-demand device 82. When the first thermal valve 98 is in an energized or a heated state and the peizoelectric element of the first drop-on-demand device 80 is activated, the model material 16 located adjacent the first thermal valve 98 liquefies, e.g., undergoes a phase change, thereby facilitating flow and drop-by-drop dispensing of the model material 16 via the peizoelectric element of the first drop-on-demand device 80.

Figure 15:
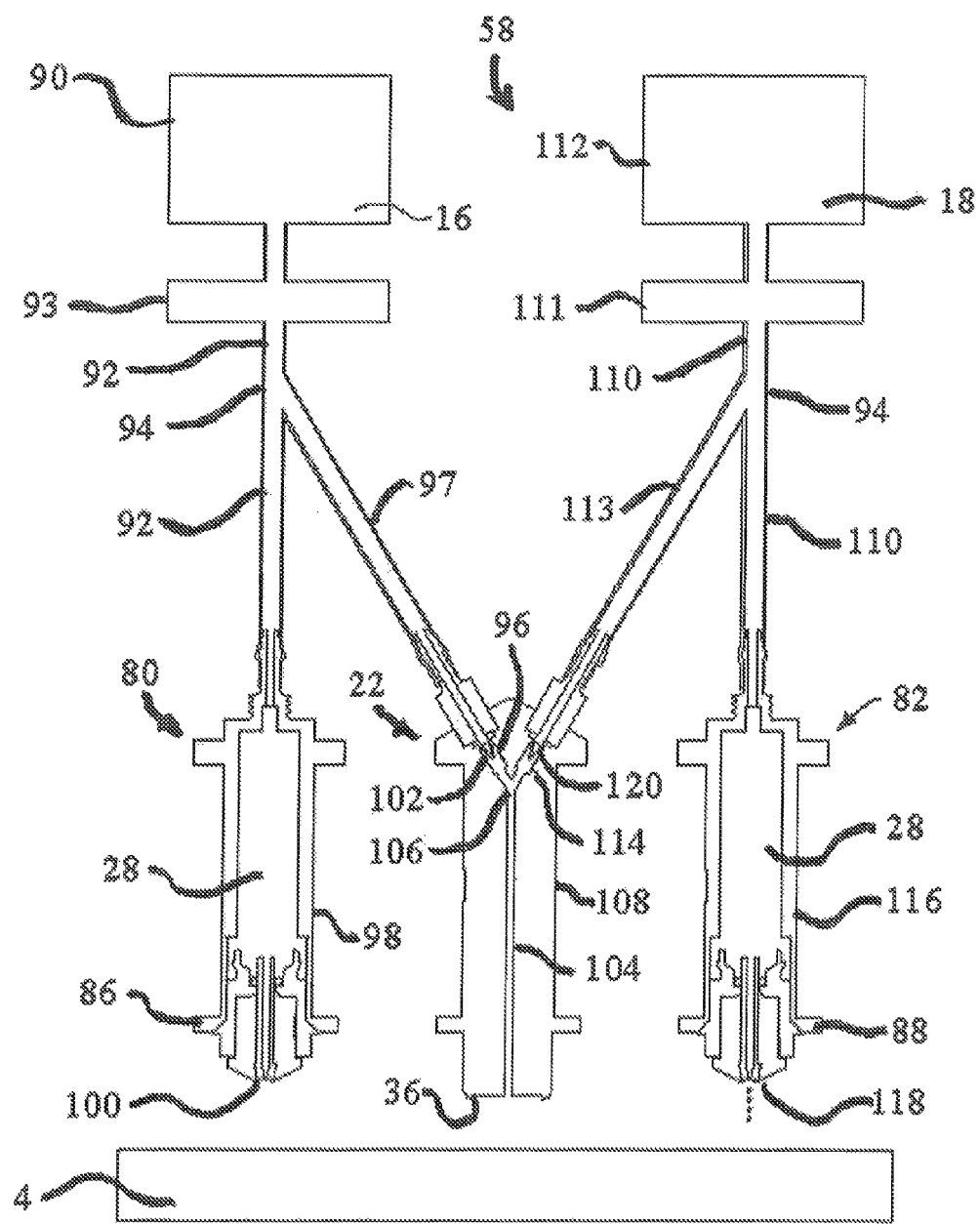
FIG. 15 is a diagrammatic illustration of the system of FIG. 13 showing dispensing of the sacrificial material on a drop-by-drop basis.

In addition, during the normal print operating mode as shown in FIG. 15, if desired, alternatively again both the sacrificial material pump 111 and the model material pump 93 remain deactivated. A peizoelectric element is located adjacent the discharge outlet (e.g., the second drop-on-demand printhead 88) of the second drop-on-demand device 82 and this peizoelectric element acts as a pump to eject droplets of the sacrificial material 18, as desired. The sacrificial material 18 is supplied along the second main supply conduit 110, via the second flow stream, into the internal material supply passage 28 of the second drop-on-demand device 82. Additionally during this mode, both the first and the second thermal valves 98, 108 are in a cooled state which thereby prevent the flow of the material through the common high viscosity rapid deposition head 22 and the first drop-on demand device 80. When the third thermal valve 116 is in an energized or a heated state and the peizoelectric element of the second drop-on-demand device 82 is activated, the sacrificial material 18 located adjacent the third thermal valve 116 liquefies, e.g., undergoes a phase change, thereby facilitating flow and drop-by-drop dispensing of the sacrificial model material 18 via the peizoelectric element of the second drop-on-demand device 82.

During this normal print operating mode shown in FIGS. 14 and 15, regardless of which of the first or the second drop-on-demand devices 80, 82 is dispensing material, since the second thermal valve 108 is in a cooled state, the material (e.g., either the model material 16 or the sacrificial material 18 contained within the common high viscosity rapid deposition head 22) located adjacent the second thermal valve 108 solidifies, e.g., undergoes a phase change, which thereby prevents the flow of such material through the common high viscosity rapid deposition head 22. As a result of such arrangement, either one of the first or the second drop-on-demand devices 80, 82 can selectively be utilized for dispensing the desired material, on a drop-by-drop base, by activation of the associated peizoelectric element of the first or the second drop-on-demand device 80, 82.

In order to facilitate flow of material through the desired first or the second drop-on-demand device 80 or 82, a desired one of the first or the third thermal valves 98 or 116 is in an energized, or a heated, state so as to heat the material contained within the first or the second drop-on-demand device 80, 82 to a desired flow temperature, e.g., of about 115° C. for example, which permits the material located adjacent the first or the third thermal valve 98 or 116 to undergo a phase change and become molten and/or liquefy and thereby facilitate discharge of the associated material via the respective peizoelectric element of the drop-on-demand device.

Figure 16:
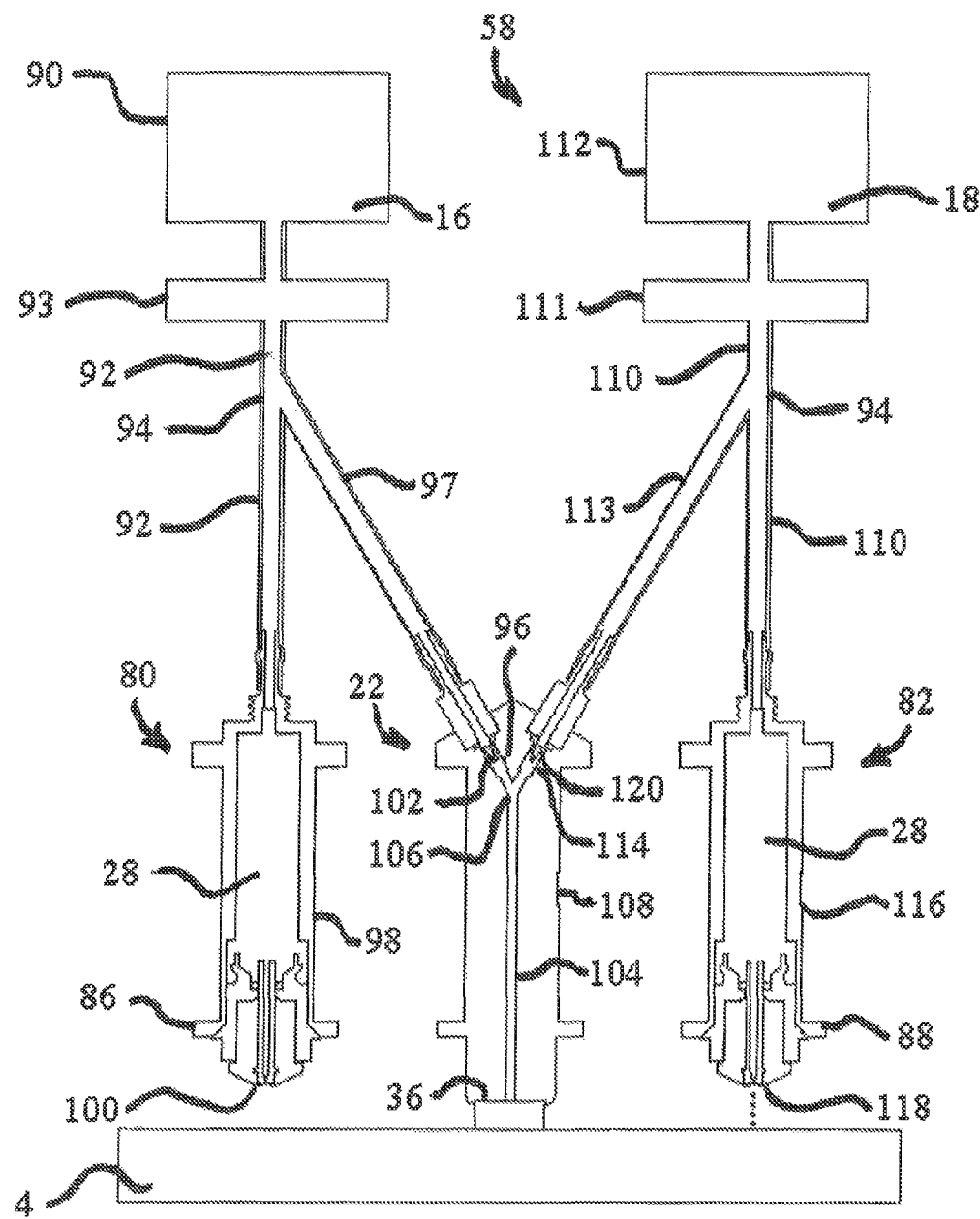
FIG. 16 is a diagrammatic illustration of the system of FIG. 13 showing a support contact coating operating mode.

FIG. 16 diagrammatically shows a support contact coating operating mode of the multi-head material deposition system 66 and a discussion concerning such operating mode will now be provided. During the support contact coating operating mode, the sacrificial material pump 111 is activated so that the sacrificial material 18 is supplied, from the sacrificial material supply source 112, along the second branch supply conduit 113 toward the common supply line 104 which communicates with the dispensing/shaping nozzle 36 of the common high viscosity rapid deposition head 22. Since the second thermal valve 108 is in an activated state, the material (e.g., either the sacrificial material 18 or the model material 16 contained within the common high viscosity rapid deposition head 22) located adjacent the second thermal valve 108 becomes molten and/or liquefies, e.g., undergoes a phase change, and thereby facilitates rapid dispensing of such material from the dispensing/shaping nozzle 36. In the event that the common supply line 104 currently contains the model material 16, instead of the sacrificial material 18, then the contents of the common supply line 104 and the dispensing/shaping nozzle 36 must be adequately purged, as discussed above, before commencing the support contact coating operation. However, if sacrificial material 18 is already contained within the common supply line 104 and the dispensing/shaping nozzle 36, then the support contact coating operation can commence dispensing immediately without undergoing any purging step. As discussed above, the second one-way valve 120 prevents the flow of the molten model material 16 upstream toward the source of the sacrificial material 18 and thereby prevents intermixing of the two material streams with one another.

The sacrificial material pump 111 generally also supplies the sacrificial material 18 along the second main supply conduit 110 toward the internal material supply passage 28 of the second drop-on-demand device 82. However, since the third thermal valve 116 is in a cooled state, the sacrificial material 18 located adjacent the third thermal valve 116 solidifies, e.g., undergoes a phase change, which thereby prevents the flow of the sacrificial material 18 through the second drop-on-demand device 82.

In addition, the model material pump 93 is deactivated so that the model material 16 is not supplied along the first main supply conduit 92 to the first drop-on-demand device 80. Further, since the first thermal valve 98 is in a cooled state, the model material 16 located adjacent the first thermal valve 98 solidifies, e.g., undergoes a phase change, which thereby prevents flow of the model material 16 through the first drop-on-demand device.

Figure 17:
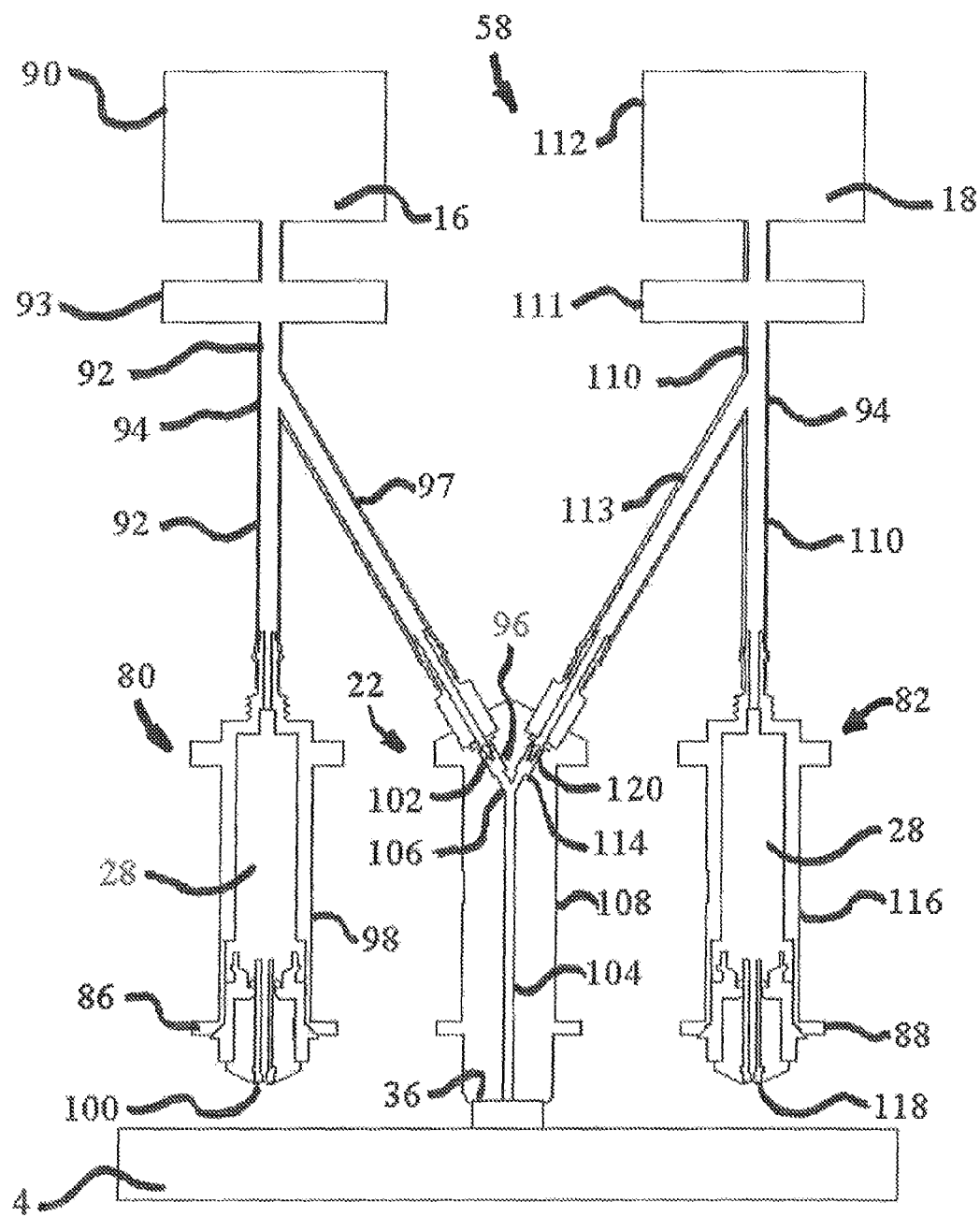
FIG. 17 is a diagrammatic illustration of the system of FIG. 13 showing a build contact coating operating mode.

With reference now to FIG. 17, a build contact coating mode is diagrammatically shown for the multi-head material deposition system 66 and will now be briefly described. According to the build contact coating mode, the model material pump 93 is activated so that the model material 16 is supplied along the first branch supply conduit 97 toward the common supply line 104 which communicates with the dispensing/shaping nozzle 36 of the common high viscosity rapid deposition head 22. Since the second thermal valve 108 is in an activated state, the material (e.g., either the sacrificial material 18 or the model material 16 contained within the common high viscosity rapid deposition head 22) located adjacent the second thermal valve 108 becomes molten. e.g., undergoes a phase change, and thereby facilitates rapid dispensing of the material from the dispensing/shaping nozzle 36. In the event that the common supply line 104 currently contains sacrificial material 18, instead of the desired model material 16, then the contents of the common supply line 104 and the dispensing/shaping nozzle 36 must be sufficiently purged, as discussed above, before commencing the build contact coating operation. However, if model material 16 is already contained within the common supply line 104 and the dispensing/shaping nozzle 36, then the build contact coating operation can immediately commence without a purging step. The first one-way valve 102 prevents the flow of the molten sacrificial material 18 upstream toward the source of the model material 16 and thereby prevents intermixing of the two material streams with one another.

The model material pump 93 also generally supplies the model material 16 along the first main supply conduit 92 toward the internal material supply passage 28 of the first drop-on-demand device 80. However, since the first thermal valve 98 in a cooled state, the model material 16 located adjacent the first thermal valve 98 solidifies, e.g., undergoes a phase change, which thereby prevents the flow of the model material 16 through the first drop-on-demand device 80.

In addition, the sacrificial material pump 111 is deactivated so that the sacrificial material 18 is not supplied along the second main supply conduit 110 to the second drop-on-demand device 82. Further, since the third thermal valve 116 is in a cooled state, the sacrificial material 18 located adjacent the third thermal valve 116 solidifies, e.g., undergoes a phase change, which thereby prevents the flow of the sacrificial material 18 through the second drop-on-demand device 82.

It is to be appreciated when switching from either the build contact coating mode to the support contact coating mode, or vice versa, a purging step is typically required. That is, any residual sacrificial or model material 16, 18, for example, still remaining within the common supply conduit 104 and the dispensing/shaping nozzle 36 of the common high viscosity rapid deposition head 22 must be adequately purged prior to commencing the other of the build or the support contact coating mode. In order to accomplish this, the common high viscosity rapid deposition head 22 of the multi-head material deposition system 66 is typically conveyed to a purging area, remote from the build area of the 3-D model being constructed, and either the sacrificial material 18, if the support contact coating mode is desired, or the model material 16, if the build contact coating mode is desired, is supplied to and along the common supply conduit 104 and the dispensing/shaping nozzle 36 for a short duration of time, e.g., a few seconds or so, in order to purge completely all of the residual material contained within the common supply conduit 104, the material dispensing cavity 44 and the dispensing/shaping nozzle 36. Once the purging procedure is completed, the common high viscosity rapid deposition head 22 is then returned back to the 3-D model fabrication area where the desired build or the support contact coating process then commences.

It is to be appreciated that locating the first and the second one-way valves 102, 120 and the standard Y-coupling 106 as close as possible to the dispensing/shaping nozzle 36 minimizes the amount of material and the purging time required to completely cleanse and/or purge the residual material from the common supply conduit 104 prior to switching from either the build contact coating mode to the support contact coating mode, or vice versa.

Figure 18:
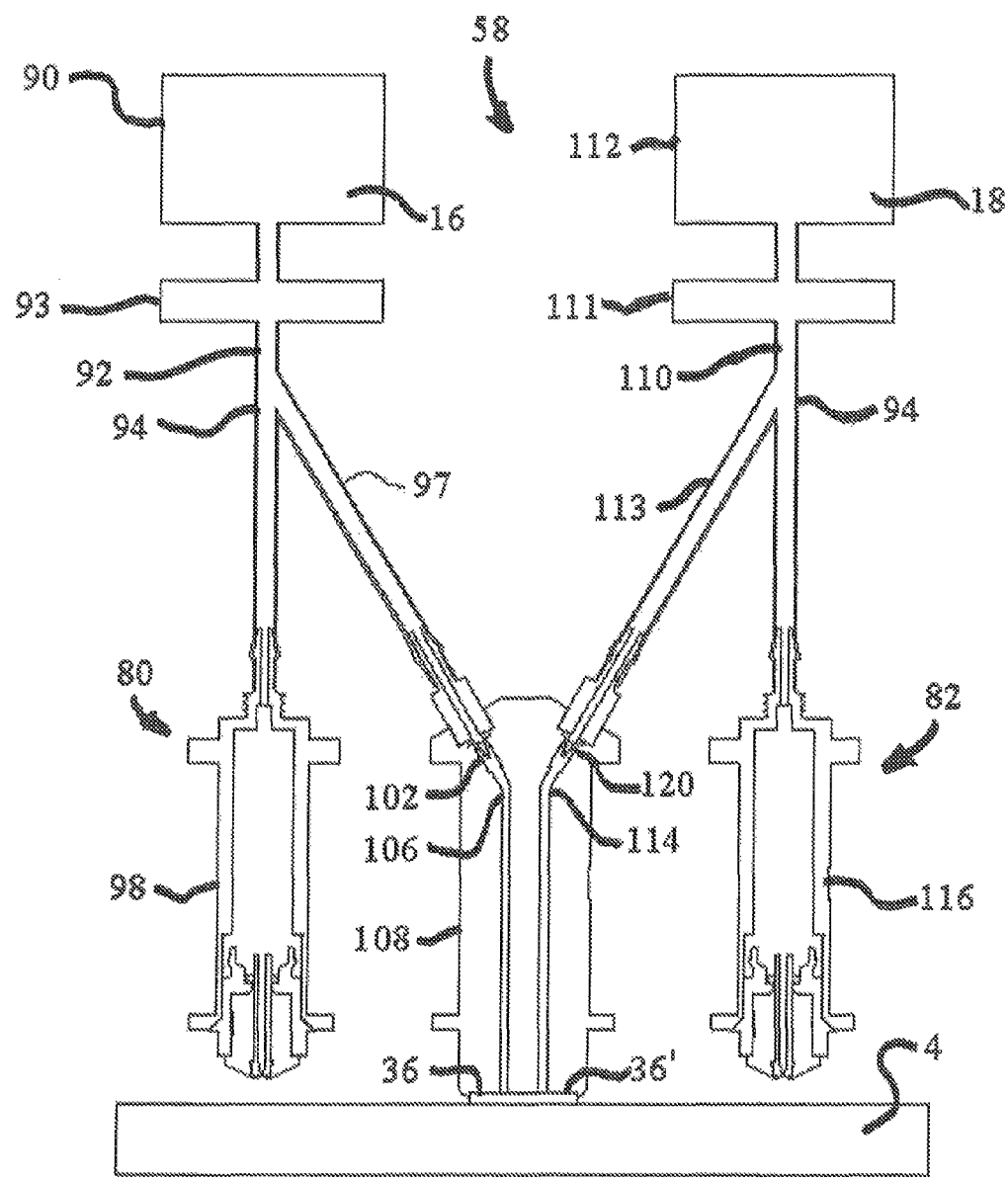
FIG. 18 is a diagrammatic illustration of a second embodiment of the multi-head material deposition system according to the present invention.

Turning now to FIG. 18, a second embodiment of the multi-head material deposition system 66 according to the present invention, will now be briefly discussed. As this embodiment is quite similar to the previous embodiment, only the differences between this second embodiment and the previous embodiment will be discussed in detail.

The major difference between this second embodiment and the previous embodiment is the elimination of standard Y-coupling 106, the common supply conduit 104, possibly the first and the second one way valves 102, 120 and possibly the common dispensing/shaping nozzle 36. That is, according to this embodiment, the first branch supply conduit 97 of the model material 16 flows through the first inlet 96 of the common high viscosity rapid deposition head 22, either directly or possibly via the first one-way valve 102. The first branch supply conduit 97 of the model material 16, then continues and extends along the entire length of the common high viscosity rapid deposition head 22 and directly communicates with a corresponding first dispensing/shaping nozzle 36 which facilitates the direct discharge of the model material 16, during the build contact coating mode of operation.

Similarly, according to this embodiment, the second branch supply conduit 113 of the sacrificial material 18 flows through the second inlet 114 of the common high viscosity rapid deposition head 22, possibly through the second one-way valve 120. The second branch supply conduit 113 of the sacrificial material 18, then continues and extends along the entire length of the common high viscosity rapid deposition head 22, closely adjacent to the first branch supply conduit 97 for the model material 16, and directly communicates with a corresponding second dispensing/ shaping nozzle 36' which facilitates the direct discharge of the sacrificial material 18 during the support contact coating mode of operation.

This second embodiment avoids the need to purge the common supply conduit 104, the material dispensing cavity 44 and/or the common dispensing/shaping nozzle 36 prior to switching from the build contact coating mode to the support contact coating mode, or vice versa. One disadvantage of this embodiment, however, is that the system must keep track of which material is being dispensed from which one of the respective dispensing/shaping nozzles 36, 36' in order to adequately compensate and control the location where such material is deposited on to the preceding layer 38. The first dispensing/shaping nozzle 36 and the second dispensing/shaping nozzle 36' generally are located closely adjacent one another, e.g., for dispensing/shaping nozzles 36, 36' with a diameter of 0.01 inches, the center to the center spacing of the dispensing/shaping nozzle 36, 36' will typically be about 0.04 inches. When switching from the first dispensing/ shaping nozzle 36 to the second dispensing/shaping nozzle 36', and vice versa, the system must compensate for this spacing between the two discharge nozzles 36, 36' in order to facilitate accurate disposition of the desired material on the desired layer being fabricated.

While not specifically shown in detail, it should be understood that is possible to operate both embodiments in either a normal printing operating condition in which the contact coating device 104 is not utilized. Instead, the respective material 16, 18 would flow directly through the main supply conduits 92, 110 to the associated drop-on-demand devices 80, 82. It should be recognized that a disadvantage of this operating condition is that deposition of the materials is rather dilatory. Furthermore, it should be understood that other types of flow control mechanisms, instead of the thermal valves 98, 108, 116, may be utilized for controlling the flow of material to the desired devices without departing from the spirit and scope of the present invention.

Figure 19:
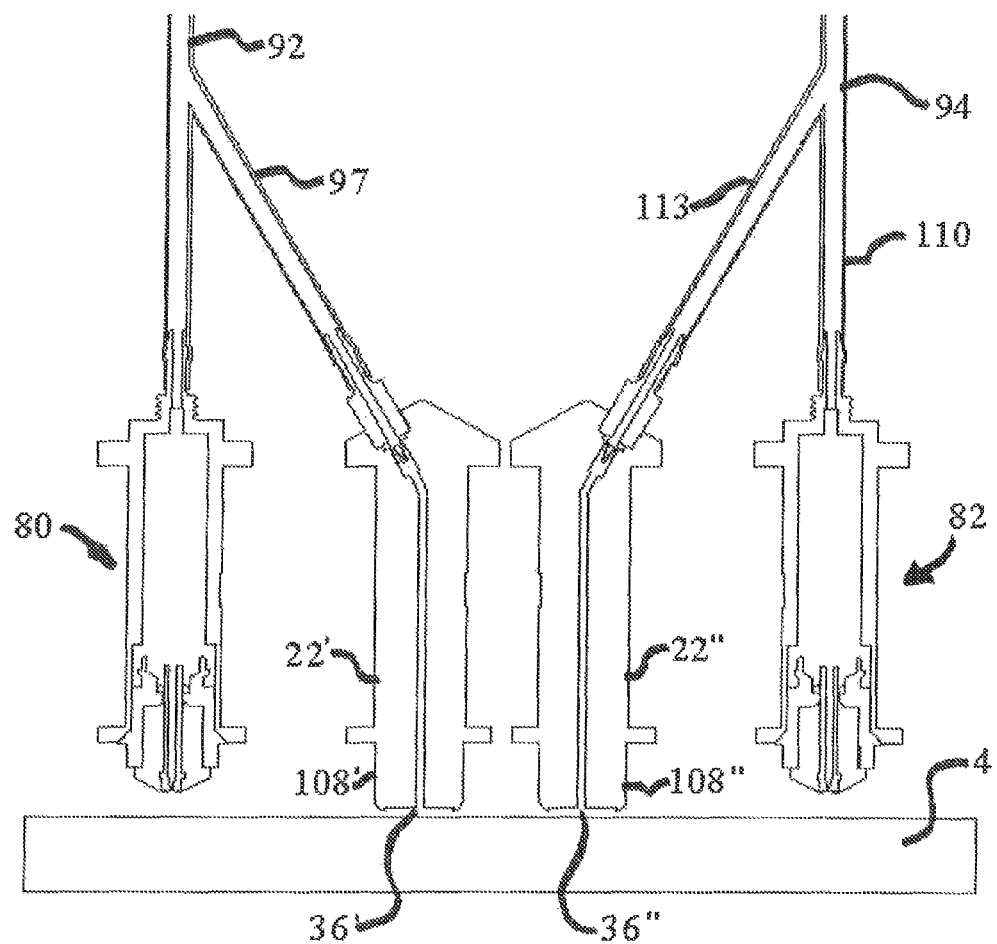
FIG. 19 is a diagrammatic illustration of a third embodiment of the multi-head material deposition system according to the present invention.

Turning now to FIG. 19, a third embodiment of the multi-head material deposition system 66, according to the present invention, will now be briefly discussed. As this embodiment is quite similar to the second embodiment, only the differences between the second and the third embodiments will be discussed in detail.

The major difference between the third and the second embodiments is that the common high viscosity rapid deposition head 22 is replaced with a pair of separate high viscosity rapid deposition heads 22', 22" which are located and supported closely adjacent one another. The first high viscosity rapid deposition head 22' contains the first second branch supply conduit 97, an associated second thermal valve 108' and an associated dispensing/shaping nozzle 36'. The second high viscosity rapid deposition head 22" contains the second branch supply conduit 113, an associated second thermal valve 108" and an associated dispensing/ shaping nozzle 36". This arrangement functions substantially the same as the second embodiment, and thus a further detailed discussion concerning the same is not provided.

Operation of Device

Lastly with respect to the operation of the contact coating device 20 implemented with any of the high viscosity rapid deposition head 22, the combined high viscosity rapid deposition head 54 or the multi-head deposition head 66, or in the case of any other form of rapid deposition device, it will be recognized that the rapid and efficient deposit of high volumes of both high or low viscosity material, onto the layer 26 currently being fabricated, depends upon the efficiency of the traveled path of the material deposition device, during the deposition process, over the preceding layer 38. That is, and stated another way, the path traveled by the material deposition device, such as the contact coating device 20, should be controlled to travel along the shortest overall travel path in order to deposit the desired material on the preceding layer 38 in the most efficient manner. This typically translates into the path to be traveled by the deposition device having a minimum number of changes in direction since each change in direction typically requires a halt, or a reduction at the very least, in the travel speed of the deposition device or the execution of steps directed at avoiding or eliminating unwanted excess deposits of material.

Figure 20:
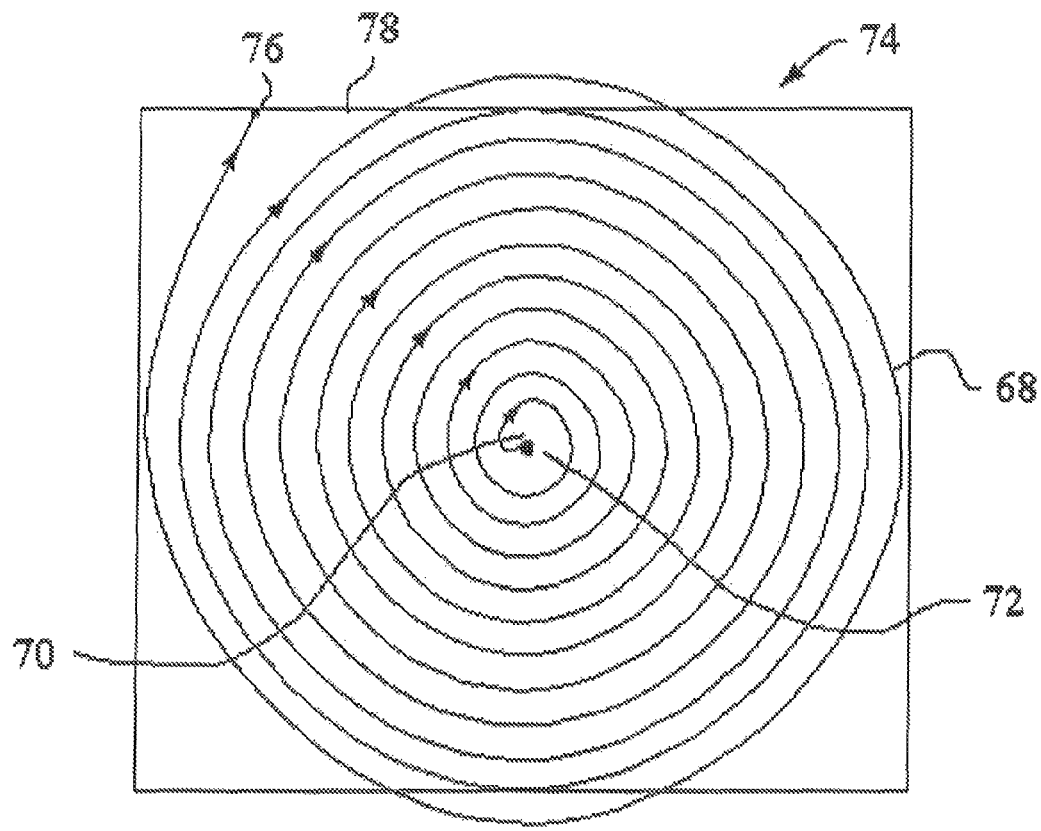
FIG. 20 diagrammatically illustrates high efficiency paths for the rapid deposition of high and lower viscosity materials.

FIG. 20 illustrates examples of two possible high efficiency travel paths for the combined high viscosity rapid deposition head for either, or both, high and lower viscosity materials. As depicted therein, the basic path 68 traversed by the exemplary contact coating device 20 is essentially a spiral path which commences a starting point 70 located at, or near, the center 72 of an area 74 to be covered by the rapid deposition material, and an end point 76 located remote from the starting point 70 and typically adjacent a periphery 78 of the area 74 to be covered by the rapid deposition material. It will be recognized, however, that the area 74 to be covered may occupy only a part of the preceding layer 38 and that the area 74 may be of irregular shape which does not lend itself to a spiral or a circular deposition path. Methods and computer programs, for the examination and creation of efficient dispensing paths, for covering virtually any required area or route, are well known in the art, and, according to the present invention, may be employed in or used in conjunction with a system controller 18, as described herein above, with respect to the fabrication system 2 to determine the most efficient travel path for the rapid deposition device. Alternatively, as also shown in FIG. 20, the basic path 68 traversed by the exemplary contact coating device 20 may commence a starting point 76 located adjacent a periphery 78 of the area 74 to be covered by the rapid deposition material and terminate at an end point 70 located at, or near, the center 72 of the area 74 to be covered by the rapid deposition material.

Since certain changes may be made in the above described method and apparatus for fabricating three-dimensional models using a rapid deposition device without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A contact coating device for fabricating a model, the contact coating device comprising:
    a high viscosity rapid deposition head comprising a deposition body defining a material supply passage;
    a dispensing/shaping nozzle being formed in a leading end surface of the high viscosity rapid deposition head for dispensing of the high viscosity material from the high viscosity rapid deposition head, and the dispensing/shaping nozzle comprising a material dispensing cavity;
    at least one dispensing passage having a material outlet formed in a base surface of the material dispensing cavity, the at least one dispensing passage providing communication between the material supply passage and the dispensing/shaping nozzle for suppling the high viscosity material to the material dispensing cavity; and
    a heating element for heating a portion of the high viscosity rapid deposition head and facilitating flow of the high viscosity material through the high viscosity rapid deposition head and into the material dispensing cavity.

2. The contact coating device according to claim 1, wherein the at least one dispensing passage comprises a first dispensing passage which facilitates drop-on-demand dispensing of the high viscosity material and at least one second dispensing passage which facilitates rapid dispensing of the high viscosity material.

3. The contact coating device according to claim 2, wherein the first dispensing passage which facilitates drop-on-demand dispensing of the high viscosity material is centrally located within the high viscosity rapid deposition head; and
    the at least one second dispensing passage, which facilitates rapid dispensing of the high viscosity material, is located circumferentially about the centrally located first dispensing passage.

4. The contact coating device according to claim 1, wherein at least one of a length and a width of the material dispensing cavity extends substantial across a portion of the leading end surface of the high viscosity rapid deposition head and the base surface of the material dispensing cavity is spaced from the leading end surface.

5. The contact coating device according to claim 1, wherein a flow rate of the high viscosity material, when extruded from the high viscosity rapid deposition head, ranges between 0.5 and 2 feet/second;
    the high viscosity rapid deposition head is capable of traveling at a rate of between 0.5 and 2 feet/second,
    the high viscosity material, when extruded from the high viscosity rapid deposition head, has a flow pressure ranging between 5 and 10 psi; and
    the high viscosity material has a viscosity of at least 6,000 centipoise and comprises at least one of thermal-plastic, a precious metal and a non-precious metal.

6. The contact coating device according to claim 1, wherein a deposition end surface of the dispensing/shaping nozzle is flush with the leading end surface of the high viscosity rapid deposition head so that the dispensing/shaping nozzle is entirely accommodated within the high viscosity rapid deposition head and a discharge orifice of the dispensing/shaping nozzle is formed in the deposition end surface.

7. The contact coating device according to claim 6, wherein the dispensing/shaping nozzle and the deposition end surface of the high viscosity rapid deposition head together function as a spreading tool for spreading and shaping the deposited high viscosity material on a layer being fabricated so that the deposited high viscosity material has a uniform thickness.

8. The contact coating device according to claim 6, wherein the material dispensing cavity forms a reserve source of the high viscosity material for forming a layer of the high viscosity material being fabricated which is deposited and substantially fills a space between the deposition end surface and a preceding layer.

9. The contact coating device according to claim 6, wherein the deposition end surface, during contact coating, is located at a distance of about six thousandths of an inch (0.006 inch) or less from a preceding layer.

10. The contact coating device according to claim 1, wherein a transverse cross sectional flow area of a discharge orifice of the dispensing/shaping nozzle is larger than a transverse cross sectional flow area of the at least one dispensing passage.

11. The contact coating device according to claim 1, wherein the contact coating device controllably dispenses at least one of a build/model material and a support/sacrificial material.

12. The contact coating device according to claim 1, wherein the high viscosity rapid deposition head is connected to a source of the high viscosity material, and the high viscosity material, during dispensing, is conveyed by a pressure source to and through the high viscosity rapid deposition head.

13. The contact coating device according to claim 1, wherein the deposition body is manufactured from a conductive material which facilitates conducting heat from the heating element through the deposition body to the high viscosity material contained within the supply passage to facilitate flow thereof through the deposition body.

14. The contact coating device according to claim 1, wherein the dispensing/shaping nozzle has a discharge orifice which is formed in the leading end surface, and the discharge orifice facilitates dispensing of a desired quantity of the high viscosity material from the dispensing/shaping nozzle on a layer being fabricated.

15. The contact coating device according to claim 1, wherein the material dispensing cavity holds a desired quantity of the high viscosity material to be dispensed, and the material dispensing cavity has a length dimension ranging between 0.1 and 0.05 inches, a width dimension ranging between 0.1 and 0.05 inches and a depth ranging between 0.005 and 0.01 inches.

16. The contact coating device according to claim 1, wherein, when the contact coating device is dispensing material on a drop by drop basis, the at least one dispensing passage is spaced between 0.05 and 0.1 inches from a preceding layer.

17. The contact coating device according to claim 1, wherein the contact coating device is supported by a fabrication system, and the fabrication system comprises:
a vertically movable workpiece support table for supporting a model to be fabricated;
a movable tool platform located vertically above the workpiece support table; and
the contact coating device being supported by the tool platform so that the tool platform facilitates at least lateral movement of the contact coating device relative to the workpiece support table.

18. The contact coating device according to claim 17, wherein the high viscosity rapid deposition head is axially movable with respect to at least one of another material deposition device or the tool platform so as to avoid interference during operation of the fabrication system.

19. The contact coating device according to claim 1, wherein the contact coating rapid deposition head comprises a Y-coupling which is connected with a common supply line, a first branch of the Y-coupling communicates with a first source for supplying the high viscosity material while a second branch of the Y-coupling communicates with a second source for supplying a second material, and the common supply line communicates with the dispensing/shaping nozzle of the contact coating rapid deposition head.

20. A contact coating device comprising:
a high viscosity rapid deposition head comprising a deposition body defining a material supply passage;
a dispensing/shaping nozzle being formed in a leading end surface of the high viscosity rapid deposition head for dispensing of the high viscosity material from the high viscosity rapid deposition head, and the dispensing/shaping nozzle comprising a material dispensing cavity;
the dispensing/shaping nozzle having a discharge orifice being formed in the leading end surface of the high viscosity rapid deposition head and the discharge orifice having a width which extends across a major portion of a width of the leading end surface;
at least one dispensing passage providing communication between the material supply passage and the dispensing/shaping nozzle for suppling the high viscosity material to the material dispensing cavity for dispensing the high viscosity material through the discharge orifice; and
a heating element for heating a portion of the high viscosity rapid deposition head and facilitating flow of the high viscosity material through the high viscosity rapid deposition head and into the material dispensing cavity.

21. A contact coating device comprising:
a high viscosity rapid deposition head comprising a deposition body defining a material supply passage;
a dispensing/shaping nozzle being formed in a leading end surface of the high viscosity rapid deposition head for dispensing of the high viscosity material from the high viscosity rapid deposition head, and the dispensing/shaping nozzle comprising a material dispensing cavity being formed in and extending into the deposition body;
the dispensing/shaping nozzle having a discharge orifice being formed in the leading end surface of the high viscosity rapid deposition head;
at least one dispensing passage providing communication between the material supply passage and the dispensing/shaping nozzle for suppling the high viscosity material to the material dispensing cavity for dispensing the high viscosity material through the discharge orifice;
a transverse cross sectional flow area of the discharge orifice being larger than a transverse cross sectional flow area of the at least one dispensing passage; and
a heating element for heating a portion of the high viscosity rapid deposition head and facilitating flow of the high viscosity material through the high viscosity rapid deposition head and into the material dispensing cavity.

* * * * *